(12) United States Patent
Beamon

(10) Patent No.: US 7,280,640 B2
(45) Date of Patent: *Oct. 9, 2007

(54) UTILITIES MODULE FOR PROACTIVE MAINTENANCE APPLICATION

(75) Inventor: Elizabeth Ann Beamon, Kannapolis, NC (US)

(73) Assignee: AT&T BLS Intellectual Property, Inc., Wilmington, DE (US)

(*) Notice: Subject to any disclaimer, the term of this patent is extended or adjusted under 35 U.S.C. 154(b) by 27 days.

This patent is subject to a terminal disclaimer.

(21) Appl. No.: 11/261,989

(22) Filed: Oct. 28, 2005

(65) Prior Publication Data

US 2006/0050854 A1    Mar. 9, 2006

Related U.S. Application Data

(63) Continuation of application No. 11/014,372, filed on Dec. 15, 2004, now Pat. No. 7,027,563, which is a continuation of application No. 09/728,195, filed on Nov. 30, 2000, now Pat. No. 6,845,148.

(60) Provisional application No. 60/212,207, filed on Jun. 16, 2000.

(51) Int. Cl.
*H04M 1/24* (2006.01)
*H04M 3/08* (2006.01)
*H04M 3/22* (2006.01)

(52) U.S. Cl. .................. 379/9.02; 379/9; 379/9.03; 379/9.04; 379/15.03

(58) Field of Classification Search ............. 379/9, 379/9.01, 9.02, 9.03, 9.04, 9.06, 15.01, 15.02, 379/15.03, 14, 27.01, 29.01, 201.03, 201.12; 714/100, 12, 25, 26; 370/241, 241.1; 702/183, 702/184

See application file for complete search history.

(56) References Cited

U.S. PATENT DOCUMENTS

| | | | |
|---|---|---|---|
| 5,790,633 A | 8/1998 | Kinser, Jr. et al. | |
| 5,953,389 A | 9/1999 | Pruett et al. | |
| 6,353,902 B1 | 3/2002 | Kulatunge et al. | |
| 6,446,123 B1 | 9/2002 | Ballantine et al. | |
| 6,614,882 B1 | 9/2003 | Beamon et al. | |
| 6,845,148 B1 | 1/2005 | Beamon | |
| 7,027,563 B2 * | 4/2006 | Beamon | 379/9.02 |

* cited by examiner

*Primary Examiner*—Quoc Tran
(74) *Attorney, Agent, or Firm*—Cantor Colburn LLP

(57) ABSTRACT

A method of managing proactive maintenance tasks for a communication system. The method includes storing proactive maintenance tasks and searching the tasks using at least one search criteria. Deletion of a proactive maintenance tasks is permitted if the proactive maintenance task has not been sent to a technician dispatch module which dispatches proactive maintenance tasks to technicians. Exclusion of proactive maintenance tasks is permitted if the proactive maintenance task has been sent to the technician dispatch module.

17 Claims, 27 Drawing Sheets

FIG. 12

Search Criteria

PMA Number: _____  LMOS TTN: _____

Status: _____  Specify Sort Order? _____

NPA WC: _____  Dist: _____

Manager: _____

Supervisor: _____

Tech: _____

Work By: From: _____ To: _____

Pending: From: _____ To: _____

Dispatch: From: _____ To: _____

Complete: From: _____ To: _____

Work Address: _____

Work Description: _____

FST Narrative: _____

Disp Code: _____  IST: _____  Work Code: _____

Priority: _____  Type: _____

Auth #: _____

Cable: _____  Pair: _____

FIG. 13

Search Criteria

| Field | Sort Order |
|---|---|
| PMA Number: _____ | N: _____ |
| Status: _____ | Order? _____ |
| NPA WC: _____ | PMA _____ |
| Manager: _____ | NPA _____ |
| Supervisor: _____ | Wire Center _____ |
| Tech: _____ | District _____ |
| Work By: From: _____ | Manager _____ |
| Pending: From: _____ | Supervisor _____ |
| Dispatch: From: _____ | Technician _____ |
| Complete: From: _____ | Priority _____ |
| Work Address: _____ | Status _____ |
| Work Description: _____ | Authorization _____ |
| FST Narrative: _____ | Work By Date _____ |
| Disp Code: _____ | Pending Date _____ |
| Priority: _____ | Dispatch Date _____ |
| Auth #: _____ | Complete Date _____ |
| Cable: _____ | TTN _____ |
| Work Code: _____ | Type _____ |
| Type: _____ | Work Address _____ |

FIG. 14

| PMA Number | Auth | NPA | Wire Ctr | Dist Num | S | Pending Date | Work By Date | Dispatch Date | Complete Date |
|---|---|---|---|---|---|---|---|---|---|
| 990603181 | | 404 | 283 | 1773 | D | 6/10/00 | 6/10/00 | 6/10/00 | |
| 990603322 | | 404 | 283 | 1773 | | 6/10/00 | 6/10/00 | 6/10/00 | |
| 990603187 | | 404 | 284 | 1773 | | 6/10/00 | 6/10/00 | 6/10/00 | |
| 990601004 | | 404 | 285 | 1773 | | 6/3/00 | 6/3/00 | 6/3/00 | |
| 990603524 | | 404 | 285 | 1773 | | 6/10/00 | 6/10/00 | 6/10/00 | |

Manager: Smith   Supervisor: Jones
Technician: 999 999 999
IST: DPO   Line Records:   404283RTAP01   LMOS TTN:   1134
Pre-Assign: Y   Priority: 5   Estimated Time: 8   Actual Time:
Additional Tasks: N   Task: 1 of 1   # Cable Recs: 0
FST Narrative: ETA 0747A
Work Address: Main Street Work Center
Work Description: Run Helium on Buried Cable to Locate Air Leak N - Notes, C - Cable, M - Messages, D - Dispatch, E - Edit, S - Select, P - Print, F - Find, Q - Quit

FIG. 15

| PMA Number | Auth | NPA | Wire Ctr | Dist Num | S | Pending Date | Work By Date | Dispatch Date | Complete Date |
|---|---|---|---|---|---|---|---|---|---|
| 000603181 | | 404 | 283 | 1773 | D | Notes | 6/10/00 | 6/10/00 | |

FIG. 16

| PMA Number | Auth | NPA | Wire Ctr | Dist Num | S | Pending Date | Work By Date | Dispatch Date | Complete Date |
|---|---|---|---|---|---|---|---|---|---|
| 990603181 | | 404 | 283 | 1773 | D | 6/10/00 | 6/10/00 | 6/10/00 | |
| 990603322 | | 404 | 283 | 1773 | | 6/10/00 | 6/10/00 | 6/10/00 | |
| 990603187 | | 404 | 284 | 1773 | | 6/10/00 | 6/10/00 | 6/10/00 | |
| 990601004 | | 404 | 285 | 1773 | | 6/3/00 | 6/3/00 | 6/3/00 | |
| 990603524 | | 404 | | | | | | 6/10/00 | |

PMA Cable Records

| Cable | Low Pair | High Pair |
|---|---|---|
| 1612 | 76 | 100 |

Manager:
Technician
IST: DPC
Pre-Assign
Additional
FST Narra
Work Add
Work Des

Actual Time: 1134

N - Notes, C - Cable, M - Messages, D - Dispatch, E - Edit, S - Select, P - Print, F - Find, Q - Quit

FIG. 17

| PMA Number | Auth | NPA | Wire Ctr | Dist Num | S | Pending Date | Work By Date | Dispatch Date | Complete Date |
|---|---|---|---|---|---|---|---|---|---|
| 990603181 | | 404 | 283 | 1773 | D | 6/10/00 | 6/10/00 | 6/10/00 | |
| 990603322 | | 404 | 283 | 1773 | | 6/10/00 | 6/10/00 | 6/10/00 | |
| 990603187 | | 404 | 284 | 1773 | | 6/10/00 | 6/10/00 | 6/10/00 | |
| 990601004 | | 404 | 285 | 1773 | | 6/3/00 | 6/3/00 | 6/3/00 | |
| 990603524 | | 404 | 285 | 1773 | | 6/10/00 | 6/10/00 | 6/10/00 | |

Other Messages

Created by: Smith
Dispatch Time: 0747        Complete Time: 1200
LMOS Return Message:   0055501 Created TN 205221RTPPS08
LMOS Time Stamp: 06/01/00 07:15:37  pckmcryk FST Narrative: ETA 0747A
Work Address: Main Street Work Center
Work Description: Run Helium on Buried Cable to Locate Air Leak N - Notes,   C - Cable, M - Messages, D -Dispatch, E - Edit, S - Select, P - Print, F - Find, Q -Quit

FIG. 18

| PMA Number |
|---|
| 990603181 |
| 9906… |
| 9906 |
| 9906 |
| 9906 |

——— Dispatch Data ———
IST: pao    Dispatch Date: 06/01/00    Complete Date

Dispatch

| PMA Number | Tech | IST | Work Address |
|---|---|---|---|
| 00060183 | | pao | 123 Main ST. |

N - Notes, C - Cable, M - Messages, D -Dispatch, E - Edit, S - Select, P - Print, F - Find, Q -Quit

FIG. 19

| PMA Number | Auth | NPA | Wire Ctr | Dist Num | S | Pending Date | Work By Date | Dispatch Date | Complete Date |
|---|---|---|---|---|---|---|---|---|---|
| 990603181 | | 404 | 283 | 1773 | D | 6/10/00 | 6/10/00 | 6/10/00 | |
| 990603322 | | 404 | 283 | 1773 | | 6/10/00 | 6/10/00 | 6/10/00 | |
| 990603187 | | 404 | 284 | 1773 | | 6/10/00 | 6/10/00 | 6/10/00 | |
| 990601004 | | 404 | 285 | 1773 | | 6/3/00 | 6/3/00 | 6/3/00 | |
| 990603524 | | 404 | 285 | 1773 | | 6/10/00 | 6/10/00 | 6/10/00 | |

Manager: Smith   Supervisor: Jones
Technician 999 999 999
IST: IDPO   Line Records: 404283RTAP01   LMOS TTN: 1134
Pre-Assign: Y   Priority: 5   Estimated Time: 8   Actual Time:
Additional Tasks: N   Task: 1 of 1   # Cable Recs: 0
FST Narrative: ETA 0747A
Work Address: Main Street Work Center
Work Description: Run Helium on Buried Cable to Locate Air Leak N - Notes, C - Cable, M - Messages, D - Dispatch, E - Edit, S - Select, P - Print, F - Find, Q - Quit

FIG. 20

| PMA Number | Auth | NPA | Wire Ctr | Dist Num | S | Pending Date | Work By Date | Dispatch Date | Complete Date |
|---|---|---|---|---|---|---|---|---|---|
| 990603181 | | 404 | 283 | 1773 | D | 6/10/00 | 6/10/00 | 6/10/00 | |
| 990603322 | | 404 | 283 | 1773 | | 6/10/00 | 6/10/00 | 6/10/00 | |
| 990603187 | | 40 | | | | | | 0/00 | |
| 990601004 | | 40 | | | | | | 3/00 | |
| 990603524 | | 40 | | | | | | 0/00 | |

Enter E-Mail Recipient's Address.

Valid User ID's

| ID | Name | Phone | Supv |
|---|---|---|---|
| Aainpql | CASH, JOHN | (555)-8268 | NONE |
| Gdowmfh | JONES, GEORGE | (555)555-1234 | NONE |
| Keppbyz | NELSON, WILL | (555)555-7890 | ocziua |
| Jjtbiqp | ROBBINS, MARTY | (555)555-5561 | mispnc |
| Nhtapql | WILLIAMS, H | (555)555-3456 | lpbyiv |
| Pmcxakl | WYNETTE, T. | (555)555-3456 | pbbufs |

N - Notes, C                                                                     -Quit

FIG. 21

PMA PENDING DATA      ADD

NPA:    Wire Center:      Dist #:      Mgr:
                                                     Supv:
Maintenance Center:                          Clear Data? Yes
Type:           Pre-Assign:                     Priority: 5
Auth:           Pre-Est:            IST:        Tech:
Additional Tasks:    Task: 1 of 1           Pending Date:
                                                     Dispatch Date:
Work Code:                                     Work By Date:
Work Address:
Work Desc:

FIG. 22

---- Delete Routine Status ----
PMA Number: 005845339

| PMA Number | NPA | Wire Ctr | Dist | Status | Pending Date | Dispatch Date | Complete Date | Type |
|---|---|---|---|---|---|---|---|---|
| 005845339 | 205 | 221 | 1111 | P | 06/01/00 | | | RTAP |

Mgr: SMITH        Supv: JONES
Tech:             Pre-Assign: N    Maintenance Ctr: 900
Presurvey Est: 6hr 0 min    Additional Tasks: N Work Address: TEST
Work Desc: TEST Task: 1 of 1

1 record found. Delete? no

FIG. 23

| | Exclude Routine Status |
| --- | --- |
| | PMA Number: 005845339 |

| PMA Number | NPA | Wire Ctr | Dist | Status | Pending Date | Dispatch Date | Complete Date | Type |
| --- | --- | --- | --- | --- | --- | --- | --- | --- |
| 005845339 | 205 | 221 | 1111 | P | 06/01/00 | | | RTAP |

Mgr: SMITH                Supv: JONES
Tech:           Pre-Assign: N
Presurvey Est: 6hr 0 min      Additional Tasks: N      Maintenance Ctr: 900

Work Address: TEST
Work Desc: TEST

Task: 1 of 1

1 record found. Exclude? no

FIG. 24

LMOS Return Messages

| PMA Number | LMOS Time & Date | Complete Time & Date |
|---|---|---|
| 000635924 0035226 | 06/01/00 06:15:00 created TTN 555555RTAP02 | 06/01/00 07:47:15 |
| 000655119 0059935 | 06/01/00 08:37:15 created TTN 555555RTAP13 | 06/01/00 11:56:43 |
| 000629881 0098662 | 06/02/00 14:22:56 created TTN 555555RTMISC11 | 06/03/00 09:33:40 |

P- Print, F- Find, Q- Quit

FIG. 25

Search Criteria

NPA ____
Wire Ctr: ____
Dist #: ____
Mgr: ____
Supv: ____
Hour From: ____ To: ____
Type: ____
Work Code: ____

UTILITIES MODULE FOR PROACTIVE MAINTENANCE APPLICATION

CROSS-REFERENCE TO RELATED APPLICATIONS

This application is a continuation of U.S. patent application Ser. No. 11/014,372 filed Dec. 15, 2004, now U.S. Pat. No. 7,027,563 the contents of which are incorporated by reference herein in their entirety, which is a continuation of U.S. patent application Ser. No. 09/728,195 filed Nov. 30, 2000, now U.S. Pat. No. 6,845,148 the contents of which are incorporated by reference herein in their entirety, which claims the benefit of U.S. Provisional Application No. 60/212,207, filed Jun. 16, 2000, the contents of which are incorporated by reference herein in their entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND OF THE INVENTION

1. Field of the Invention

This invention generally relates to methods for predicting proactive maintenance and, more particularly, to methods and systems for predicting proactive maintenance of the Public Switched Telephone Network.

2. Description of the Related Art

Residential and business telephone customers are connected to telephone systems by copper cables, copper wires, and even fiber optic cables. The copper cables and wires, for example, are the familiar one or more telephone lines running throughout nearly every home in the United States. Fiber optic cables are increasingly used to carry voice and data between metropolitan areas and between business locations. Because copper cable, copper wire, and even fiber optic cable connects nearly all homes and businesses to the telephone system, the Public Switched Telephone Network is a massive network composed of billions of copper cables, copper wires, and fiber optic cables. These cables and wires must be maintained to provide superior telephone service to the customer.

Copper cable and wire, however, are known to deteriorate and to degrade service. Copper cable and wire suffers from exposure to ozone, summer heat, winter cold, and water. Copper cables and wires are often strung from telephone poles, buried underground, and installed within the walls and floors of buildings. This environmental exposure is acute in older buildings and neighborhoods where the telephone lines were installed twenty-five (25) to fifty (50) years ago. Copper cables and wires, in fact, are known to deteriorate at approximately twelve percent (12%) to fifteen percent (15%) per year. The public telephone system, with its billions of copper telephone lines, requires a structured, proactive maintenance plan to ensure telephone customers receive the highest quality telephone service available in the market.

Fiber optic cable must also be maintained. Although the fiber optic cables are often routed within a protective conduit, this conduit may crack with seasonal freezing and thawing. These cracks allow water to seep into the conduit, and water affects the transmissibility of light along the fiber optic cable. Older fiber optic cable may have higher attenuation or even cable breaks. Even something as small as a kink in the fiber may cause unacceptably high optical losses. Thus, the public telephone system's increasing use of fiber optic cables requires a structured, proactive maintenance plan to ensure the highest quality telephone service.

Telephone service providers, however, are challenged when monitoring and tracking proactive maintenance procedures. Currently proactive maintenance is assigned, dispatched, and tracked in a manual environment. Management relies upon individual experience to determine when, and where, proactive maintenance is performed. Management recommends proactive maintenance, and management's recommendation funnels down to supervisors. Supervisors manually write work orders describing the proactive maintenance procedures. These work orders are then assigned to field technicians. The field technician performs the proactive maintenance and then informs the supervisor. The supervisor completes a ticket describing the completed work order, and the ticket funnels back up to management. This manual process is slower than desired, and management would prefer a rapid response to customer requests.

Individual experience and style also influence proactive maintenance efforts. Some managers strongly believe in proactive maintenance. Other managers are less familiar with proactive maintenance. Telephone customers, as a result, often have differing experiences in quality and service. Some managers know immediately what copper cables and wires are operational and ready for customer use. Other managers have a backlog of repairs and require more time to learn what lines are functioning. This varied management style reduces the ability of telephone companies to execute a unified, customer service plan.

The manual environment also does not adequately prioritize proactive maintenance. A manager may often have a backlog of proactive maintenance work order. This backlog may be assigned without a focus on the core importance of customer service. A technician, for example, may be assigned to paint a graffiti-covered crossconnect box, even though some customers are without telephone service. The manual environment too easily allows technician efforts to be mistakenly assigned to lower-priority repair work.

The manual environment also hampers bulk repair efforts. Because the manual environment does not collect and track repair work, managers and technicians have little knowledge of other repair efforts. One technician may be dispatched to a location to repair a single copper cable, and the next day another technician may be dispatched to the same location to repair another copper cable. A single technician, however, could have repaired both copper cables in a single assignment. Bulk repair is especially important when we remember there may be thousands of copper cables branching from the crossconnect boxes. The manual environment hinders managers from assigning and tracking bulk copper cable repairs to avoid unnecessary labor costs.

The manual environment also inadequately measures technician proficiency. Although some technicians can repair many copper cables in a few hours, other technicians may not be as efficient and may require more time. The manual environment simply counts the number of work orders a technician completed. The manual environment cannot monitor what really matters to internal customers; that is, the actual number of copper cables repaired by the technician. The manual environment, then, cannot monitor technician efficiency and cannot objectively measure technician performance. The manual environment fails to objectively reward technicians for their actual efforts.

There is, accordingly, a need in the art for methods and systems for predicting proactive maintenance of the Public Switched Telephone Network. These methods and systems will preferably monitor and track proactive maintenance procedures, reduce the influence of erratic management styles and beliefs, prioritize and assign bulk proactive maintenance procedures, and objectively measure technician proficiency.

BRIEF SUMMARY OF THE INVENTION

The aforementioned problems are reduced by a Proactive Maintenance Application. The Proactive Maintenance Application comprises a system that may be implemented in a computer program. The Proactive Maintenance Application acquires information representing many different departments, disciplines, and operations. The Proactive Maintenance Application, for example, may acquire one, or more, of the following types of information: engineering information, customer information, maintenance information, service information, and even real-time process information. The Proactive Maintenance Application acquires information and then combines the information to predict and to prioritize proactive maintenance procedures. Once the Proactive Maintenance Application predicts and prioritizes the proactive maintenance procedures, the Proactive Maintenance Application may even have another feature that creates and dispatches work orders. These work orders describe the proactive maintenance procedures that should be performed. Still another optional feature assigns the work orders to a particular technician. The technician receives the work orders and performs the predicted proactive maintenance procedures.

The Proactive Maintenance Application may be utilized for one or more functions. The Proactive Maintenance Application may monitor proactive maintenance, may assign proactive maintenance, and may track proactive maintenance. Because the Proactive Maintenance Application collects information from various departments and operations, one advantage is that the Proactive Maintenance Application provides a centralized database for proactive maintenance. The Proactive Maintenance Application may also be used to monitor the condition of equipment and facilities and predict what proactive maintenance should be performed. The Proactive Maintenance Application may also generate work orders describing the predicted proactive maintenance and then track the progress and completion of the work order. The Proactive Maintenance Application may even automatically update the centralized database so that management has a complete, accurate view of equipment and facilities.

The Proactive Maintenance Application may also be utilized to assign proactive maintenance in bulk. Bulk repairs reduce labor costs and improve revenue. Because the Proactive Maintenance Application monitors information from many departments, the Proactive Maintenance Application can assign a single technician to perform many overlapping repairs. The Proactive Maintenance Application can even identify what specialized skills and equipment will be needed to complete a repair and, once identified, assign those technicians that have the needed skills and equipment. The Proactive Maintenance Application may thus advantageously reduce labor costs by reducing redundant technician dispatches. Bulk repairs also quickly provide more facilities for more customers and, thus, more revenue for the company.

It should be understood that the foregoing description of the Proactive Maintenance Application system is intended to provide an overview of the many separate inventions encompassed therein. Each of the separate inventive features of the Proactive Maintenance Application system is described in more detail below.

BRIEF DESCRIPTION OF THE SEVERAL VIEWS OF THE DRAWINGS

These and other features, aspects, and advantages of the mobile re-radiating antenna are better understood when the following Detailed Description of the Invention is read with reference to the accompanying drawings, wherein:

FIG. 12 is a graphical representation of "Search Criteria" fields in the Utilities module;

FIG. 13 is a graphical representation of "Sort Order" fields in the Utilities module;

FIG. 14 is a graphical representation of data from the Proactive Maintenance Application;

FIGS. 15-18 are graphical representations further describing additional user-selected functions shown in FIG. 14;

FIG. 19 is a graphical representation of the "Edit" function shown in FIG. 14;

FIG. 20 is a graphical representation of the "Print" function shown in FIG. 14;

FIG. 21 is a graphical representation of the "Add Routine" option shown in FIG. 11;

FIG. 22 is a graphical representation of the "Delete Routine" option shown in FIG. 11;

FIG. 23 is a graphical representation of the "Exclude Routine" option shown in FIG. 11;

FIG. 24 is a graphical representation of the "LMOS Messages" option shown in FIG. 11;

FIG. 25 is a graphical representation of the "Pending Search" option shown in FIG. 11;

DETAILED DESCRIPTION OF THE INVENTION

Figure 1:
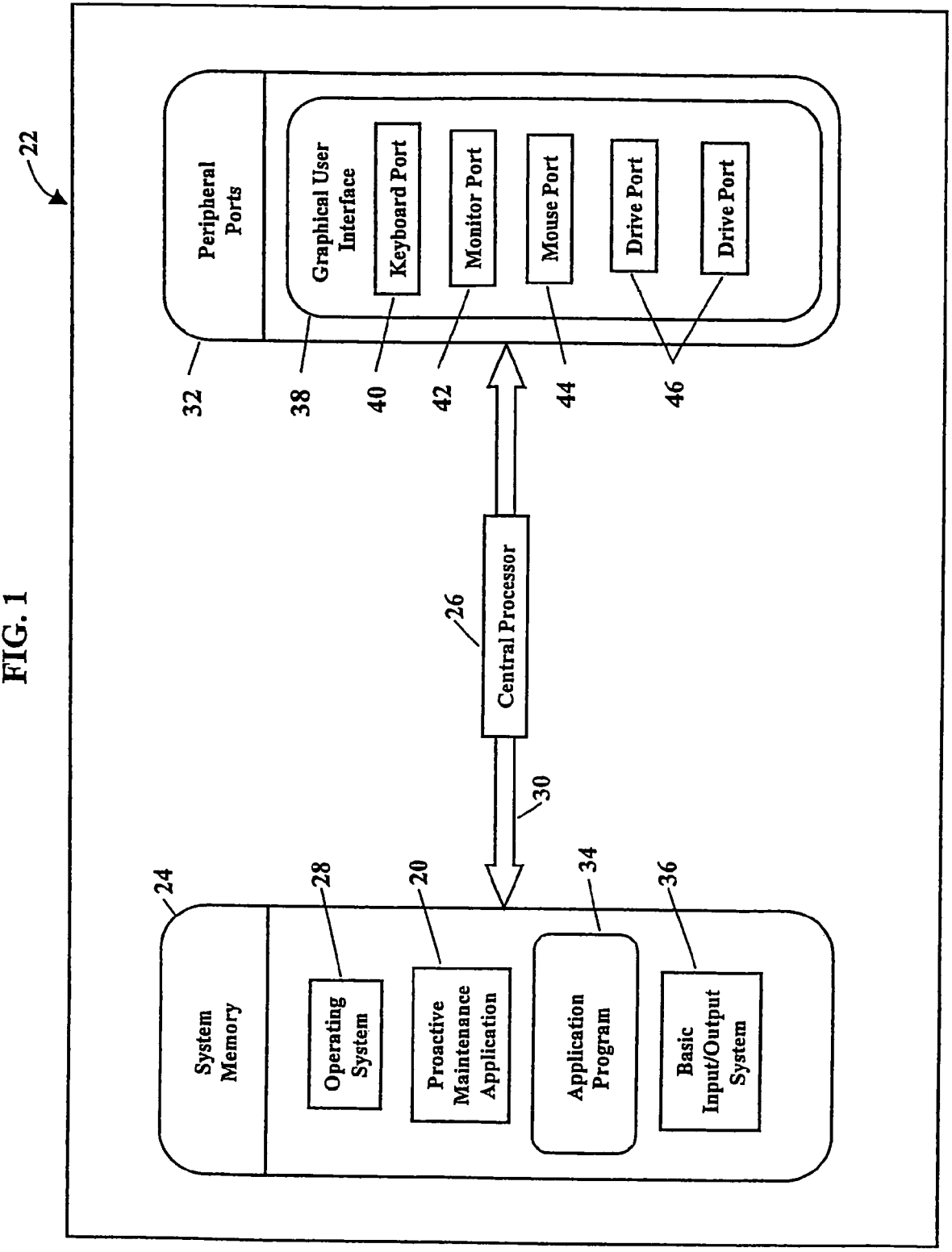
FIG. 1 is a block diagram showing the Proactive Maintenance Application residing in a computer system.

The present invention particularly relates to methods and systems of managing proactive maintenance tasks for a telephone system local loop. One embodiment comprises predicting local loop proactive maintenance tasks, storing local loop proactive maintenance tasks, and searching the tasks using at least one search criteria. The at least one search criteria could include at least one of Proactive Maintenance Application number, Trouble Ticket Number, area code, status, Wire Center, district, manager, and supervisor. The at least one search criteria could also include at least one of technician, date, address, description, technician narrative, disposition code, priority, intermediate status code, work code, authorization, cable, and line pair.

The embodiment also permits sorting and editing the local loop proactive maintenance tasks. The tasks may be sorted using at least one sort criteria. The at least one sort criteria could include at least one of Proactive Maintenance Application number, Trouble Ticket Number, area code, status, Wire Center, district, manager, and supervisor. The at least one sort criteria could also include at least one of technician, date, address, priority, status code, work code, and authorization. The embodiment may further comprise editing the local loop proactive maintenance tasks using at least one edit criteria, the edit criteria including at least one of wire center, district, priority, date, work code, manager, supervisor, technician, maintenance center, authorization, address, and work description.

The embodiment also permits additional management tasks. The embodiment may acquire cable and line pair information associated with the local loop proactive maintenance tasks. The embodiment may permit adding additional local loop proactive maintenance tasks to the stored tasks, and the embodiment may permit deleting stored local loop proactive maintenance tasks. The embodiment may also allow excluding stored local loop proactive maintenance tasks. The embodiment may comprise communicating with a communications network and acquiring information associated with a Loop Maintenance Operating System. The embodiment may comprise searching pending proactive maintenance tasks and generating summary reports describing the local loop proactive maintenance tasks. The embodiment may further comprise generating and dispatching work order information describing the local loop proactive maintenance tasks.

Another embodiment comprises a system configured for predicting proactive maintenance of a telephone system local loop. The system comprises at least one of a Dynamic Network Analyzer module and a Loop Facilities and Control System module. The Dynamic Network Analyzer module communicates with a communications network and acquires information associated with a Dynamic Network Analyzer. The Loop Facilities and Control System module communicates with the communications network and acquires information associated with a Loop Facilities and Control System. A database is stored in memory, and the database stores the acquired information. A processor is capable of processing information stored in the database and of generating predicted proactive maintenance. A Utilities module manages the predicted proactive maintenance.

Still another embodiment describes a computer program product for proactively maintaining a telephone system. This computer program product comprises a computer-readable medium, and a Utilities module is stored on the medium. The Utilities module manages local loop proactive maintenance tasks. This computer program product may also comprise a Dynamic Network Analyzer module stored on the medium. The Dynamic Network Analyzer module couples to a Dynamic Network Analyzer over a communications network. The Dynamic Network Analyzer module acquires information associated with the Dynamic Network Analyzer.

The computer program product may also comprise a Loop Facilities and Control System module stored on the medium. The Loop Facilities and Control System module couples to a Loop Facilities and Control System over a communications network. The Loop Facilities and Control System module acquires information associated with the Loop Facilities and Control System.

"Proactive maintenance" predicts what maintenance procedures should be performed to avoid later, catastrophic equipment failures. The objective is to predict and perform equipment maintenance before the equipment actually begins to fail. The systems and methods described herein can be utilized to acquire information representing many different departments, disciplines, and operations. All this information may then be used to predict the early stages of equipment failure. The systems and methods thus allow engineers and field technicians to correct early-stage failures before the normal progression of failure starts. The systems and methods of the present invention may advantageously be used to determine the need for equipment repair, or for equipment replacement, in time to avoid more catastrophic equipment failures.

Figure 2:
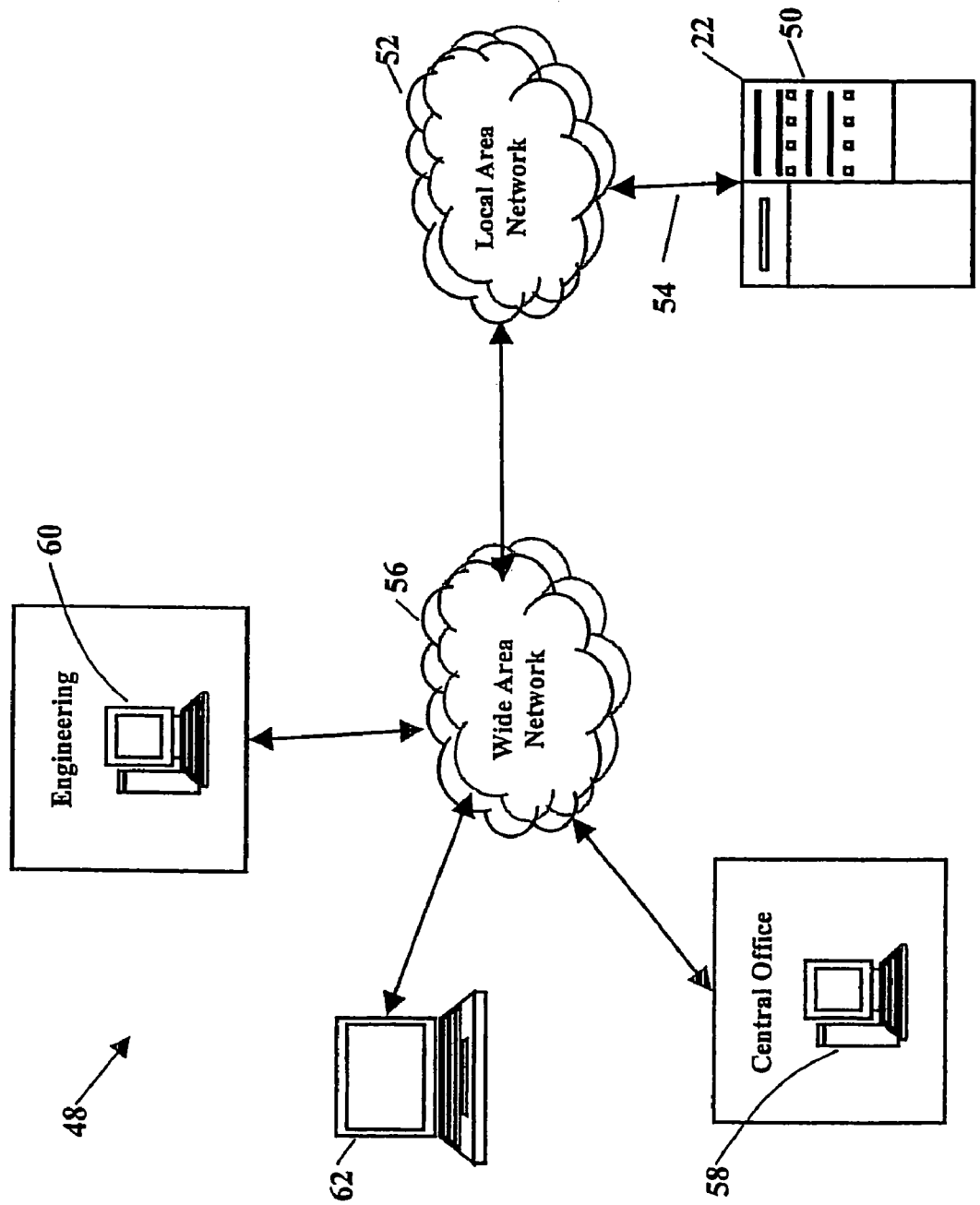
FIG. 2 is a block diagram of a communication network representing the operating environment for the Proactive Maintenance Application.

FIGS. 1 and 2 depict a possible operating environment for an embodiment of the present invention in computer software. This embodiment of a Proactive Maintenance Application 20 comprises a computer program that acquires information and predicts proactive maintenance. As those skilled in the art of computer programming recognize, computer programs are depicted as process and symbolic representations of computer operations. Computer components, such as a central processor, memory devices, and display devices, execute these computer operations. The computer operations include manipulation of data bits by the central processor, and the memory devices maintain the data bits in data structures. The process and symbolic representations are understood, by those skilled in the art of computer programming, to convey the discoveries in the art.

FIG. 1 is a block diagram showing the Proactive Maintenance Application 20 residing in a computer system 22. The Proactive Maintenance Application 20 may be stored within a system memory device 24. The computer system 22 also has a central processor 26 executing an operating system 28. The operating system 28 also resides within the system memory device 24. The operating system 28, as is well known, has a set of instructions that control the internal functions of the computer system 22. A system bus 30 communicates signals, such as data signals, control signals, and address signals, between the central processor 26, the system memory device 24, and at least one peripheral port 32. While the computer system 22 is a Hewlett Packard 9000, those of ordinary skill in the art understand that the program, processes, methods, and systems described in this patent are not limited to any particular computer system or computer hardware.

Those of ordinary skill in the art also understand the central processor 26 is typically a microprocessor. Advanced Micro Devices, Inc., for example, manufactures a full line of ATHLON™ microprocessors (ATHLON™ is a trademark of Advanced Micro Devices, Inc., One AMD Place, P.O. Box 3453, Sunnyvale, Calif. 94088-3453, 408.732.2400, 800.538.8450). The Intel Corporation also manufactures a family of X86 and P86 microprocessors (Intel Corporation, 2200 Mission College Blvd., Santa Clara, Calif. 95052-8119, 408.765.8080). Other microprocessor manufacturers include Motorola, Inc. (1303 East Algonquin Road, P.O. Box A3309 Schaumburg, Ill. 60196), International Business Machines Corp. (New Orchard Road, Armonk, N.Y. 10504, (914) 499-1900), and Transmeta Corp. (3940 Freedom Circle, Santa Clara, Calif. 95054). While only one microprocessor is shown, those of ordinary skill in the art also recognize multiple processors may be utilized. Those of ordinary skill in the art further understand that the program, processes, methods, and systems described in this patent are not limited to any particular manufacturer's central processor.

The system memory 24 also contains an application program 34 and a Basic Input/Output System (BIOS) program 36. The application program 34 cooperates with the operating system 28 and with the at least one peripheral port 32 to provide a Graphical User Interface (GUI) 38. The Graphical User Interface 38 is typically a combination of signals communicated along a keyboard port 40, a monitor port 42, a mouse port 44, and one or more drive ports 46. The Basic Input/Output System 36, as is well known in the art, interprets requests from the operating system 28. The Basic Input/Output System 36 then interfaces with the keyboard port 40, the monitor port 42, the mouse port 44, and the drive ports 46 to execute the request.

The operating system 28 is WINDOWS NT® (WINDOWS NT® is a registered trademark of Microsoft Corporation, One Microsoft Way, Redmond Wash. 98052-6399, 425.882.8080). WINDOWS NT® is preinstalled in the system memory device 24 on the Hewlett Packard 500. Those skilled in the art also recognize many other operating systems are suitable, such as UNIX® (UNIX® is a registered trademark of the Open Source Group), Linux, and Mac® OS (Mac® is a registered trademark of Apple Computer, Inc., 1 Infinite Loop, Cupertino, Calif. 95014, 408.996.1010). Those of ordinary skill in the art again understand that the program, processes, methods, and systems described in this patent are not limited to any particular operating system.

FIG. 2 is a block diagram of a communications network 48. This communications network 48 further represents an operating environment for the Proactive Maintenance Application (shown as reference numeral 20 in FIG. 1). The Proactive Maintenance Application resides within the memory storage device (shown as reference numeral 24 in FIG. 1) in the computer system 22. The computer system 22 is conveniently shown as a computer server 50 representing the Hewlett Packard 500. The computer system 22 communicates with a Local Area Network (LAN) 52 along one or more data communication lines 54. As those skilled in the art have long understood, the Local Area Network 52 is a grid of communication lines through which information is shared between multiple nodes. These multiple nodes are conventionally described as network computers. As those of ordinary skill in the art also recognize, the Local Area Network 52 may itself communicate with a Wide Area Network (WAN) 56. The communications network 48 allows the Proactive Maintenance Application to request and acquire information from many computers connected to the Local Area Network 52 and the Wide Area Network 56. The communications network 48 may even communicate with a globally distributed computing network.

As FIG. 2 shows, the Proactive Maintenance Application requests and acquires information from many other computers connected to the communications network 48. The Proactive Maintenance Application, for example, acquires information from a switching computer 58 located within at a telephone system's central office. The Proactive Maintenance Application could also acquire information from an engineering computer 60 at an engineering facility. FIG. 2 even shows that remote users, such as field technicians, may use a portable computer 62 to dial into the communications network 48 and remotely access the Proactive Maintenance Application. Because many computers may be connected to the communications network 48, computers and computers users may share and communicate a vast amount of information.

Figure 3:
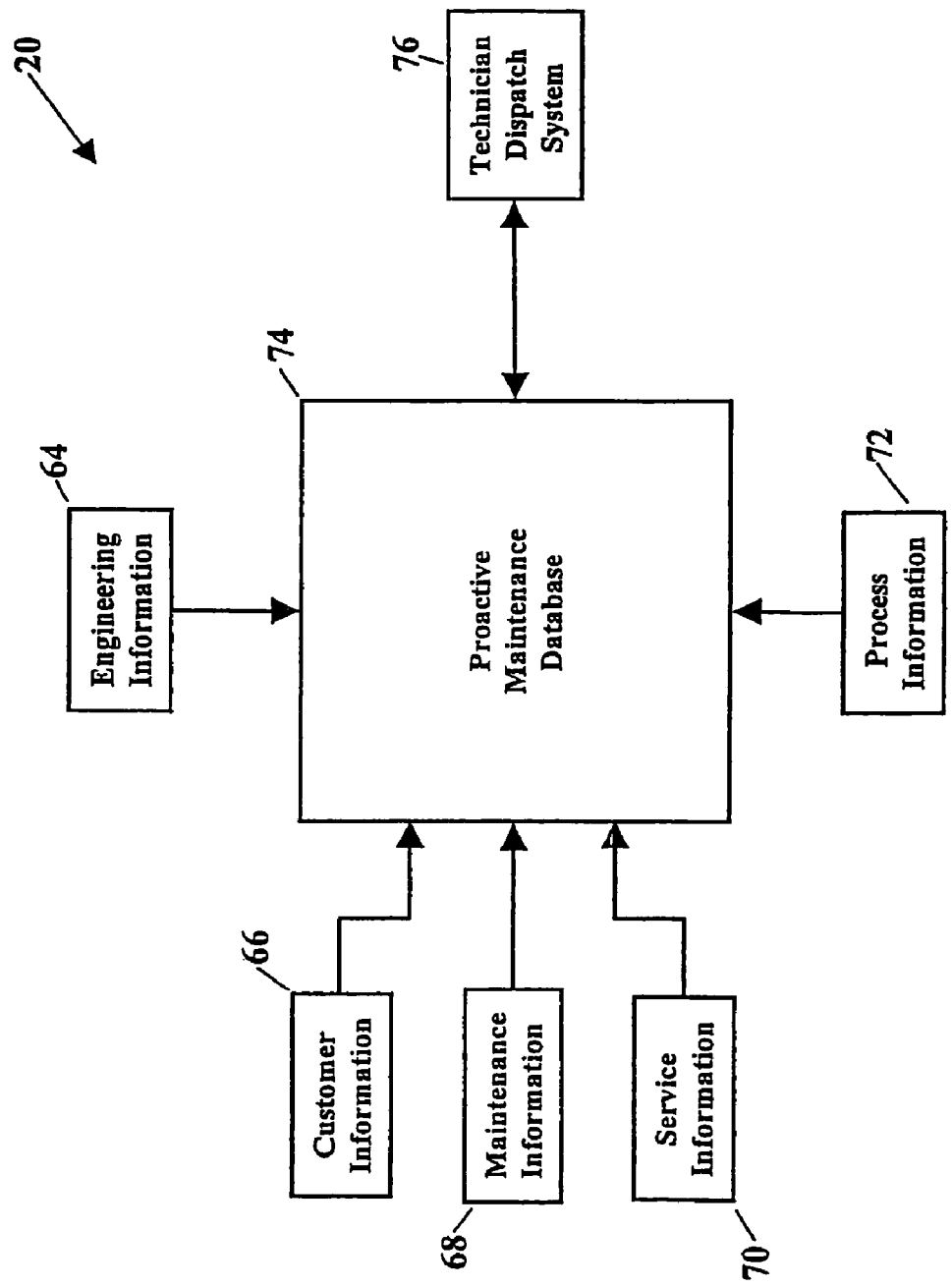
FIG. 3 is a block diagram showing one embodiment of the Proactive Maintenance 15 Application.

FIG. 3 is a block diagram showing one embodiment of the Proactive Maintenance Application 20. The Proactive Maintenance Application 20 is a computer program platform that acquires information from the communications network (shown as reference numeral 48 in FIG. 2) and uses this information to predict proactive maintenance procedures. As FIG. 3 illustrates, the Proactive Maintenance Application 20 may acquire information representing many different departments, disciplines, and operations. The Proactive Maintenance Application 20, for example, may acquire one or more of the following information types: engineering information 64, customer information 66, maintenance information 68, service information 70, and even real-time process information 72. The Proactive Maintenance Application 20 acquires this information and stores this information in a Proactive Maintenance Application Database 74. The Proactive Maintenance Application 20 then combines the acquired information, for example, the engineering information 64, customer information 66, maintenance information 68, service information 70, and/or real-time process information 72, to predict and to prioritize proactive maintenance procedures. The Proactive Maintenance Application 20 may further assign weights to each source of information to increase or decrease the influence of either combined component.

The engineering information 64 may represent various engineering activities. The engineering information 64, for example, could represent component or system durability test results, model shop equipment errors, or CAD/CAM dimensions and/or tolerances. The engineering information 64 may also represent component or system performance data, material specifications, or even government regulations. Any engineering-type information that could be used to predict proactive maintenance is considered within the ambit of the engineering information 64.

The customer information 66 may represent various customer activities. The customer information 66, for example, may represent actual customer purchasing preferences, marketing data, or customer product or process improvement suggestions. The customer information 66 may also represent customer demographic data, customer order information, or even customer profiles. Any customer-type information that could be used to predict proactive maintenance is considered within the ambit of the customer information 66.

The maintenance information 68 may represent various maintenance activities. The maintenance information 68, for example, may represent component replacement history, system or process performance history, or equipment repair history. The maintenance information 68 may also represent process measurement data, statistical process control data, maintenance logs, and even technician data. Any maintenance-type information that could be used to predict proactive maintenance is considered within the ambit of the maintenance information 68.

The service information 70 may represent various service activities. The service information 70, for example, may represent warranty information, unique or special service tooling information, limitations encountered during service repairs, or obstacles encountered during service repairs. The service information 70 may also represent field conditions (e.g. temperature, humidity, dust, and dirt), availability of original equipment manufacture (OEM) service parts, or even failure data. Any service-type information that could be used to predict proactive maintenance is considered within the ambit of the service information 70.

The real-time process information 72 may represent various process activities. The real-time process information 72, for example, may represent equipment wear indicators, gauge data, or process data (e.g., mold temperature data, cleaning/washing fluid turbidity data, or machine speed data). The real-time process information 72 may also represent re-work information, shift production data, or even line shut-down indicators. Any process-type information that could be used to predict proactive maintenance is considered within the ambit of the real-time process information 72.

The Proactive Maintenance Application 20 may even dispatch work orders. Once the Proactive Maintenance Application 20 predicts and prioritizes the proactive maintenance procedures, the Proactive Maintenance Application 20 then interfaces with a technician dispatch system 76 to create and dispatch work orders. These work orders describe the proactive maintenance procedures that should be performed. The Proactive Maintenance Application 20 may even assign the work orders to a particular technician. The technician receives the work orders and performs the predicted proactive maintenance procedures.

Those of ordinary skill, and even unskilled, in the art recognize the Proactive Maintenance Application 20 is applicable to many different environments, industries, and processes. The Proactive Maintenance Application 20 is especially applicable to the Public Switched Telephone Network. The Public Switched Telephone Network (PSTN) is composed of many switches and thousands of copper cables, copper wires, and fiber optic cables. These copper and fiber optic cables are often buried underground, strung from telephone poles, and tucked within the walls of buildings. Because these cables may deteriorate at approximately twelve percent (12%) to fifteen percent (15%) per year, the local telephone carrier needs to proactively maintain the system to provide quality telephone service. If the system is not adequately maintained, customer complaints increase, quality suffers, and costs increase.

Another reason to implement the Proactive Maintenance Application is local telephone competition. Where local telephone service was once a monopoly, competition is now coming to the local arena. There will be a mix of copper cables, trunks, switches, and services provided by each local carrier. See ROBERT A. GABLE, TELECOMMUNICATIONS DEPARTMENT MANAGEMENT 232 (1999). Perhaps the most challenging aspect of this local competition is managing the local telephone system. See id. Local telephone service providers must maintain a meticulously accurate database of their respective cables and switches. No telephone company can afford to repair and maintain another company's cables and switches. The Proactive Maintenance Application 20 could improve a local service provider's competitive position by mechanizing maintenance procedures.

Figure 4A:
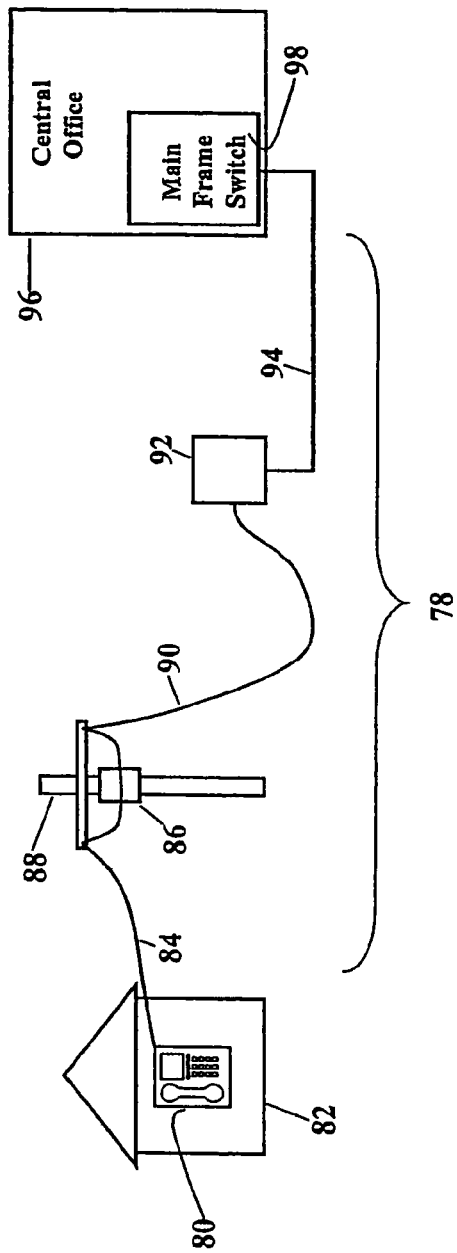
FIGS. 4A and 4B are diagrams illustrating a local loop of the Public Switched Telephone Network.
Figure 4B:
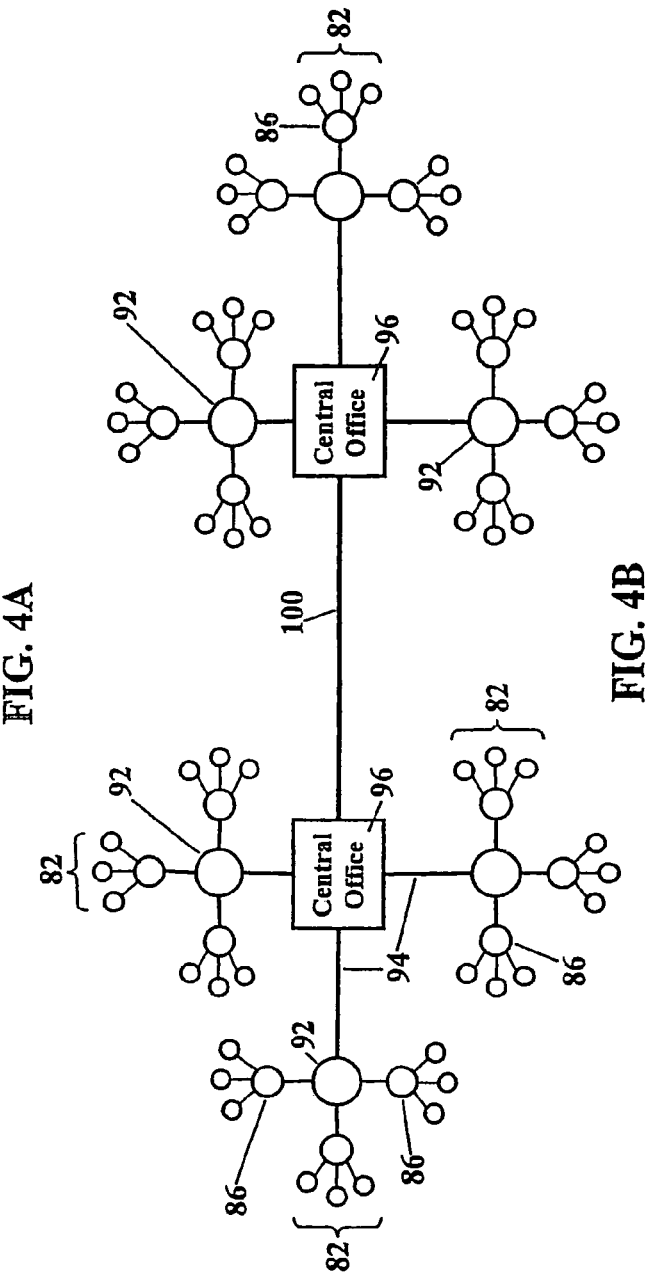

FIGS. 4A and 4B illustrate the need for proactive maintenance of the Public Switched Telephone Network. FIG. 4A is a diagram illustrating a local loop 78 of the Public Switched Telephone Network. The local loop 78 is the physical infrastructure that routes telephone calls between customers. A residential telephone customer, for example, places a call using terminal equipment 80 located inside a house 82. While FIG. 4A shows the terminal equipment 80 as a common telephone, the terminal equipment 80 could alternatively be a facsimile machine, personal computer modem, or other similar equipment. The terminal equipment 80 converts sound into electrical signals. The electrical signals travel along a copper line pair 84 to a small cross-connect 86. The small cross-connect 86 is shown located atop a utility pole 88, but the small cross-connect 86 could be located at ground level in newer installations. A distribution cable 90 carries the electrical signals from the small cross-connect 86 to a large cross-connect 92. A feeder cable 94 carries the electrical signals to a central office 96. Inside the central office is a main frame switch 98. The main frame switch 98 routes the electrical signals to the proper destination. See RICHARD A. THOMPSON, TELEPHONE SWITCHING SYSTEMS 71-72 (2000).

FIG. 4B shows the central office 96 may serve multiple local loops. While FIG. 4A shows only one (1) feeder cable 94, FIG. 4B shows that the central office 96 may serve multiple feeder cables. Each feeder cable 94 may carry thousands of copper line pairs to each respective large cross-connect 92. Each feeder cable 94, therefore, serves a different part of the community. Each large cross-connect 92, in turn, may serve as a distribution point for many small cross-connects 86. Each small cross-connect 86, in turn, serves many residential households 82. There may, in turn, be multiple central offices, with each central office 96 connected by a trunk line 100. See THOMPSON, supra, at 71. The complexity of the Public Switched Telephone Network is further magnified knowing there are approximately forty thousand (40,000) central offices located throughout the United States. See THOMPSON, supra, at 95. Such a complex system, with billions of copper line pairs and fiber optic cables, requires a meticulously detailed, logical, and simple maintenance system to ensure quality telephone service.

Figure 5:
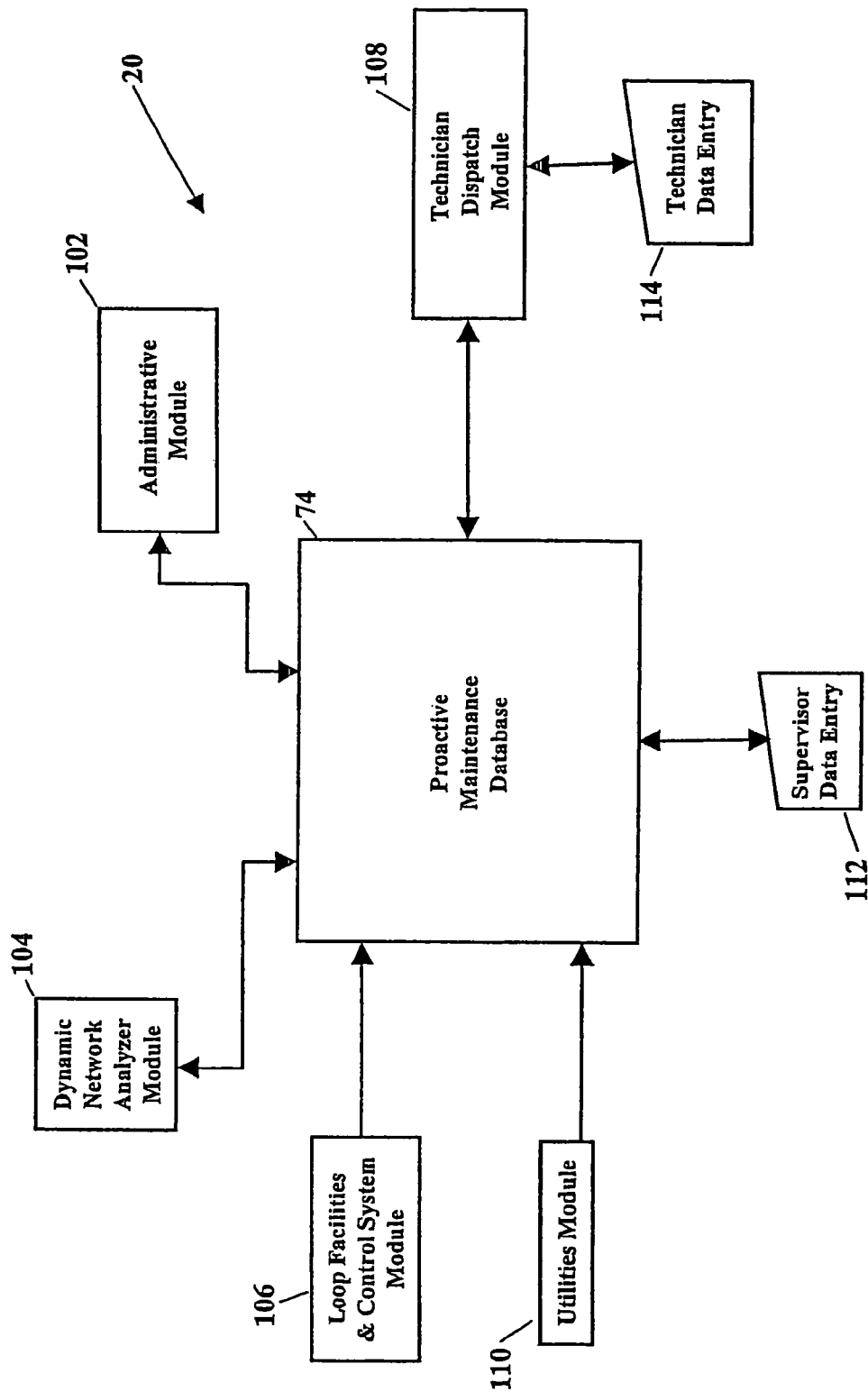
FIG. 5 is a block diagram showing an alternative embodiment of the Proactive Maintenance Application.

The Proactive Maintenance Application 20, therefore, is very useful for proactively maintaining the local loops of Public Switched Telephone Network. FIG. 5 is a block diagram showing an alternative embodiment of the Proactive Maintenance Application 20. This alternative embodiment is configured for proactively maintaining the local loop (shown as reference numeral 78 in FIG. 4A). The Proactive Maintenance Application Database 74 interfaces with other modules to predict and manage proactive maintenance. These modules include an Administrative Module 102, a Dynamic Network Analyzer Module 104, a Loop Facilities and Control System Module 106, a Technician Dispatch Module 108, and a Utilities Module 110. A Loop Engineering Information System module may also be included as shown and as described in U.S. patent application Ser. No. 09/726,751, filed Nov. 30, 2000, titled "Proactive Maintenance Application" and incorporated herein by reference in its entirety. The Proactive Maintenance Application Database 74, in addition, accepts manually-entered supervisor data 112 and manually-entered technician data 114. Each module and data input provides information for predicting and for managing proactive maintenance procedures. The Proactive Maintenance Application Database 74 acquires and combines all this information. The Proactive Maintenance Application Database 74 predicts, based upon the combined information, what proactive maintenance procedures should be performed to maintain the local loop. The Proactive Maintenance Application Database 74 prioritizes these proactive maintenance procedures. The Proactive Maintenance Application Database then interfaces with the Technician Dispatch Module 108 to generate and to dispatch proactive maintenance work orders. These proactive maintenance work orders are assigned to field service technicians, and the field service technicians perform the predicted proactive maintenance procedures.

The Proactive Maintenance Application 20 may also track the status of work orders. Not only does the Proactive Maintenance Application 20 prioritize work orders, but the Proactive Maintenance Application 20 also receives progress updates. Users of the Proactive Maintenance Application 20 can learn the date a work order was (or will be) dispatched, the name of any assigned field technician, and whether the field technician has completed the work order. The field technician may even update the Proactive Maintenance Application 20 with progress reports, estimated completion time and date, any needed equipment, or any required support. The Proactive Maintenance Application 20 thus provides a common repository or database of pending and assigned work orders for all users to access and use.

The Proactive Maintenance Application 20 may also provide historical work order information. Because the Proactive Maintenance Application 20 stores all generated work orders, the Proactive Maintenance Application 20 provides an easy and quick access to historical work order information. The Proactive Maintenance Application 20, for example, could be searched to learn how many times a particular crossconnect has been serviced, how frequently a particular customer's line has been repaired, or what areas are especially prone to repair. This historical information enables the Proactive Maintenance Application 20, and the users of Proactive Maintenance Application 20, to improve proactive maintenance and to thus improve telephone service.

The Proactive Maintenance Application 20 may be physically embodied on or in a computer-readable medium. This computer-readable medium includes CD-ROM, DVD, tape, cassette, floppy disk, memory card, and a large-capacity disk (such as IOMEGA®, ZIP®, JAZZ®, and other large-capacity memory products) (IOMEGA®, ZIP®, and JAZZ® are registered trademarks of Iomega Corporation, 1821 W. Iomega Way, Roy, Utah 84067, 801.332.1000). This computer-readable medium, or media, could be distributed to end-users, licensees, and assignees. These types of computer readable media, and other types not mentioned here but considered within the scope of the present invention, allow the Proactive Maintenance Application to be easily disseminated.

A computer program product for proactively maintaining a telephone system may comprise the computer-readable medium and one or more modules. This computer program product comprises a computer-readable medium, and the Dynamic Network Analyzer module 104 is stored on the medium. The Dynamic Network Analyzer module 104 couples to a Dynamic Network Analyzer over the communications network. The Dynamic Network Analyzer module 104 acquires information associated with the Dynamic Network Analyzer. The computer program product may also comprise the Loop Facilities and Control System module 106 stored on the medium. The Loop Facilities and Control System module 106 couples to a Loop Facilities and Control System over a communications network. The Loop Facilities and Control System module acquires information associated with the Loop Facilities and Control System. The Utilities module 110 is also stored on the medium. The Utilities module 110 manages local loop proactive maintenance tasks.

The Administrative Module 102

The Administrative Module 102 provides system administration. A systems administrator uses the Administrative Module 102 to maintain and to manage the Proactive Maintenance Application 20. The systems administrator can use the Administrative Module 102 to establish and define many parameters that the Proactive Maintenance Application 20 requires. The Administrative Module 102, for example, defines the users of the Proactive Maintenance Application 20, their passwords, and what privileges each user will have. The Administrative Module 102 may also be used to define security levels for accessing the Proactive Maintenance Application 20. One level of security, for example, may be established for those users accessing 30 the Proactive Maintenance Application 20 from outside a network firewall. Another level of security could be established for those users accessing from within the network firewall. The Administrative Module 102 may also be used to add or remove printer destinations or even edit printer information. Field supervisors may also use the Administrative Module 102 to identify field service technicians who will be assigned proactive maintenance work orders. The Administrative Module 102, in short, manages the Proactive Maintenance Application 20 and pre-populates any administrative data required by other interfaces.

The Dynamic Network Analyzer Module 104

Figure 6:
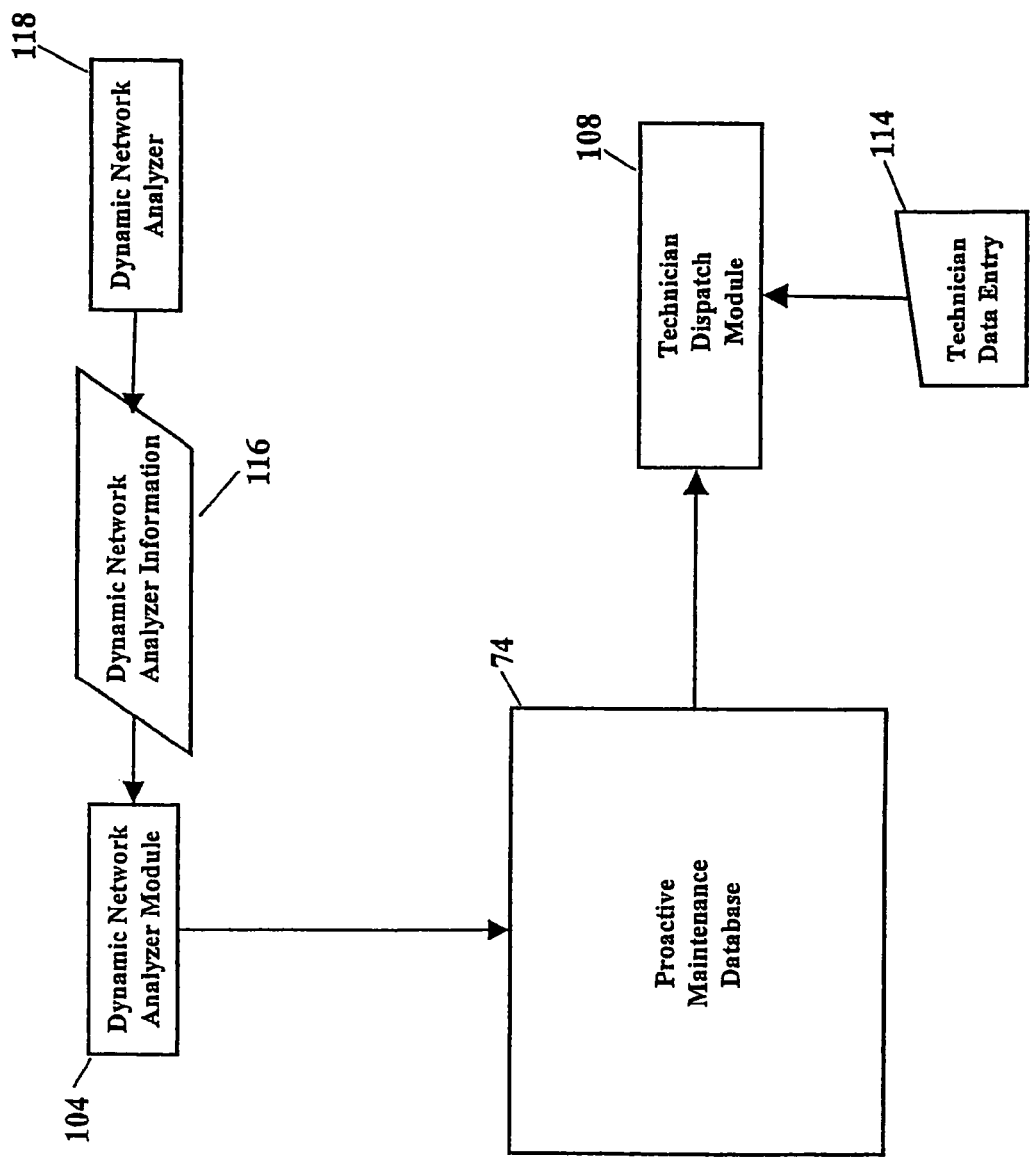
FIG. 6 is a block diagram of the Dynamic Network Analyzer Module 104 shown in FIG. 5.

FIG. 6 is a block diagram of the Dynamic Network Analyzer Module 104 shown in FIG. 5. The Dynamic Network Analyzer Module 104 provides historical information to the Proactive Maintenance Application Database 74. The Dynamic Network Analyzer Module 104 communicates with the communications network (shown as reference numeral 48 in FIG. 2) and acquires Dynamic Network Analyzer information 116 from a Dynamic Network Analyzer 118. The Dynamic Network Analyzer 118 is a software application that counts all customer trouble reports since a specific work order was issued or completed. These trouble reports, commonly referred to as Trouble Since Issued (TSI) reports, are utilized to re-prioritize open work orders on a daily basis. Each Trouble Since Issued report is associated with a particular feeder cable (shown as reference numeral 94 in FIGS. 4A and 4B) and a particular copper line pair within that feeder cable. The Dynamic Network Analyzer 118, for example, is typically run every week. The Dynamic Network Analyzer 118 generates a listing of what maintenance needs to be done based upon trouble history from customer trouble reports. The Dynamic Network Analyzer Module 104 communicates with the communications network and acquires the Dynamic Network Analyzer information 116 as an ASCII file. The Proactive Maintenance Application Database 74 acquires this ASCII file to create and prioritize maintenance work orders. The 25 Proactive Maintenance Application Database 74 then interfaces with the Technician Dispatch Module 108 to generate and dispatch proactive maintenance work orders.

The Loop Facilities and Control System Module 106

Figure 7:
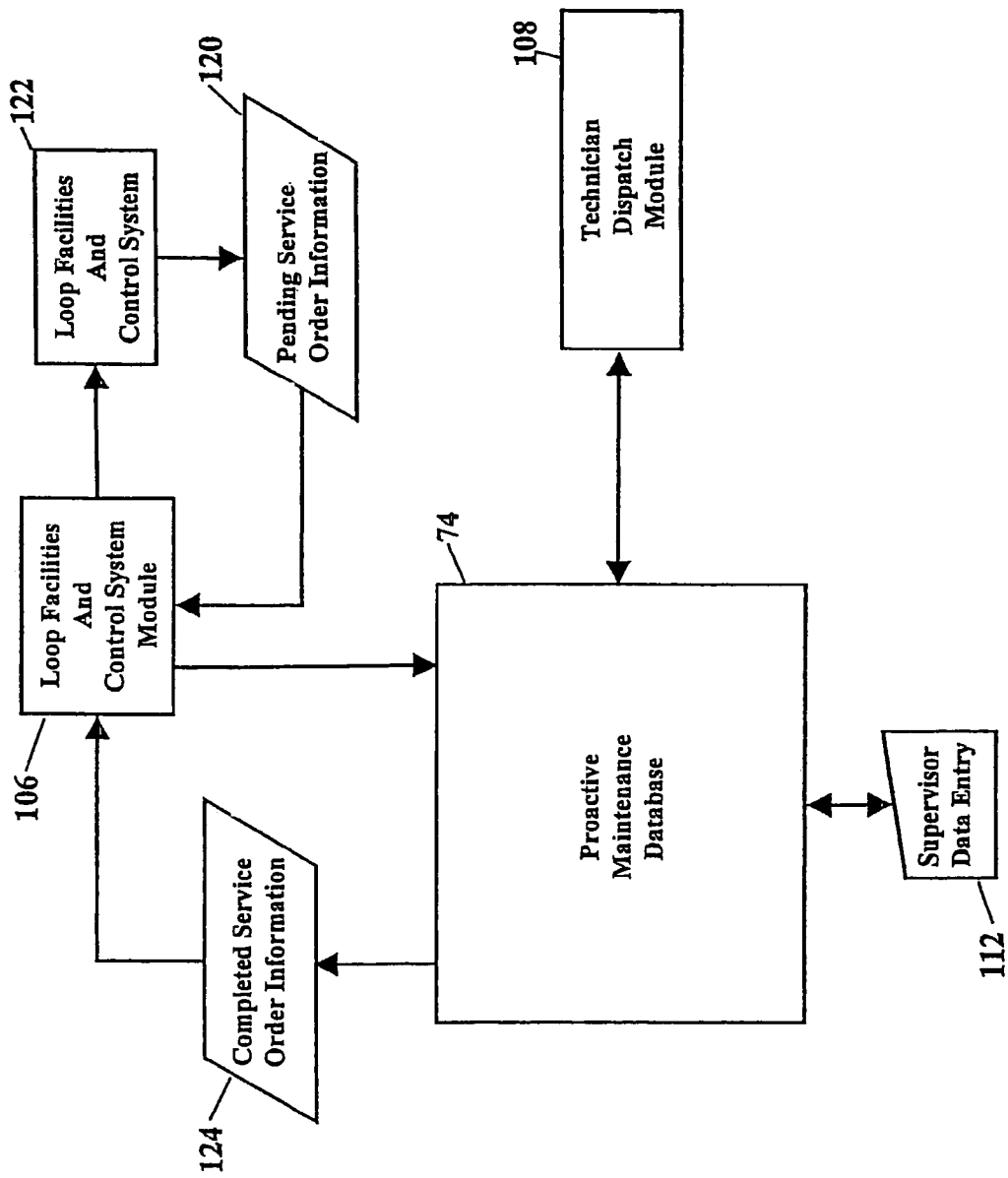
FIG. 7 is a block diagram of the Loop Facilities and Control System Module 106 shown in FIG. 5.

FIG. 7 is a block diagram of the Loop Facilities and Control System Module 106 shown in FIG. 5. The Loop Facilities and Control System Module 106 communicates with the communications network (shown as reference numeral 48 in FIG. 2) and acquires Pending Service Order Information 120 from a Loop Facilities and Control System 122. The Loop Facilities and Control System 122 maintains an engineering database of pending service orders. The Loop Facilities and Control System 122 provides the status of each copper line pair in a 5 specified feeder cable (shown as reference numeral 94 in FIGS. 4A and 4B) associated with pending service orders. Pending service orders are conventionally written up manually and distributed from management down to the technician. This conventional distribution process is extremely slow, often requiring several weeks. The Loop Facilities and Control System Module 106, however, acquires the pending service order information 120 and merges the pending service order information 120 into a proactive maintenance work order. The Proactive Maintenance Application Database 74 then interfaces with the Technician Dispatch Module 108 to generate and dispatch proactive maintenance work orders. The field technician can complete both a proactive maintenance work order and a pending service order. The Proactive Maintenance Application 20 thus eliminates the manual paper trail and eliminates the very slow conventional process.

The Proactive Maintenance Application 20 also permits the technician supervisor to immediately update the Loop Facilities and Control System 122. Once the technician supervisor assigns a particular technician, the technician supervisor can email the pending service order information 120 directly to the field technician. The technician supervisor could alternatively generate the pending service order information 120 to the field technician's computer printer. The field technician receives the pending service order information 120, completes the service order, and returns the completed service order to the technician supervisor. The technician supervisor can then immediately log into the Proactive Maintenance Application 20 and manually update the system with the completed service order. This manually-entered supervisor data 112 is acquired by the Proactive Maintenance Application 20. The Proactive Maintenance Application 20 immediately communicates completed service order information 124 to the Loop Facilities and Control System Module 106. The Loop Facilities and Control System Module 106 communicates this completed service order information 124 to the Loop Facilities and Control System 122. The Loop Facilities and Control System 122 is immediately and automatically updated with any completed service orders.

The Proactive Maintenance Application 20 is a great improvement. Pending service orders with clear defective pairs were previously manually written and distributed from management down to the technician. Any pending service order could take weeks to funnel from central management down to the actual field technician. The Proactive Maintenance Application 20, however, compresses the time to complete a pending service order. The Proactive Maintenance Application 20 can now issue a pending service order in minutes. The Proactive Maintenance Application 20 also immediately and automatically updates the Loop Facilities and Control System 122 database of pending service orders. Thus whenever a pending service order is completed, the local telephone service provider knows within minutes that a copper line pair is available for use. The now-available copper line pair is ready to provide telephone service and to generate revenue for the local telephone service provider. The Proactive Maintenance Application 20, therefore, reduces service order response times, improves utilization of copper line pairs, and increases operational revenues.

Figure 8:
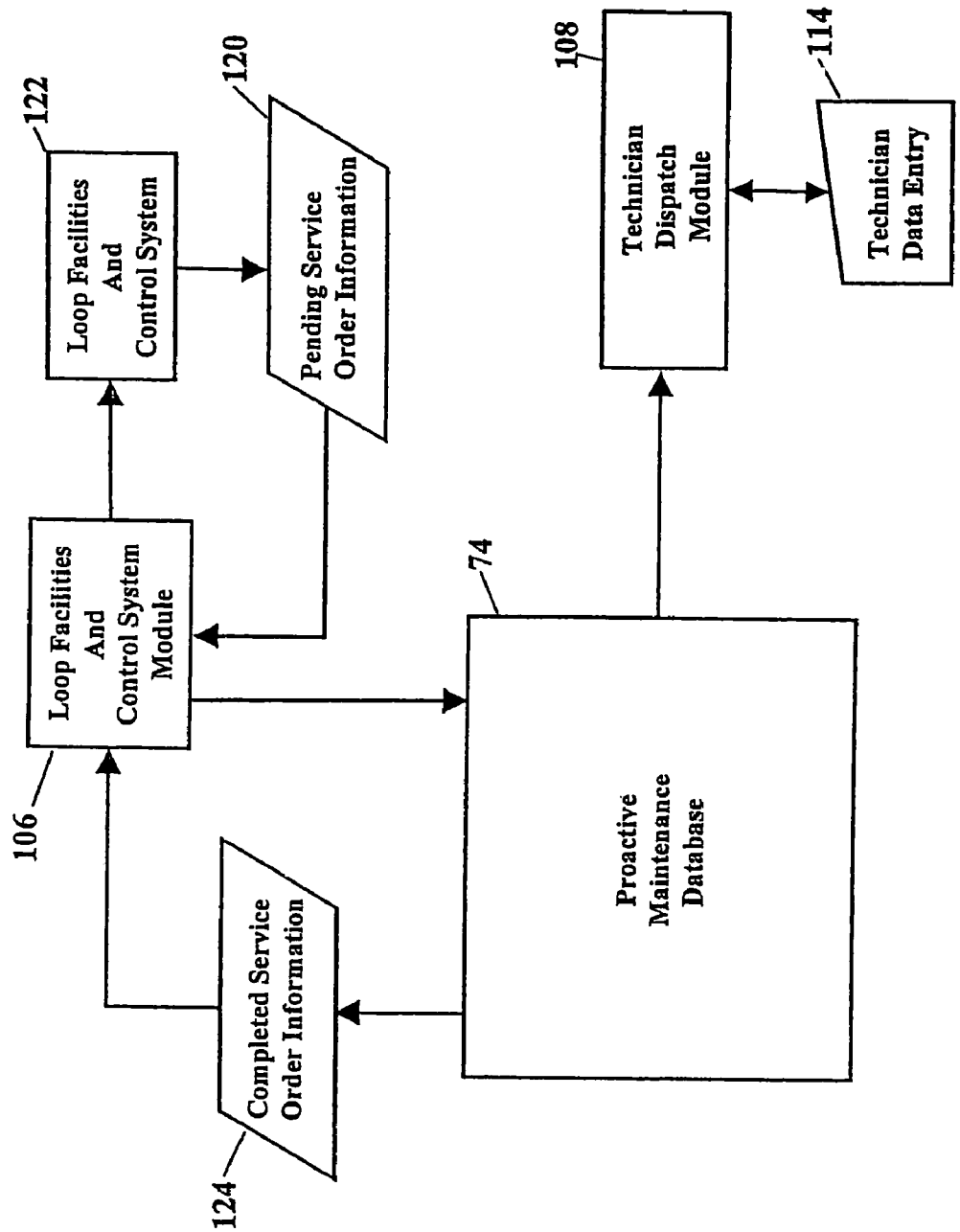
FIG. 8 is a functional block diagram of an alternate embodiment of the Loop Facilities and Control System Module 106 shown in FIG. 5.

FIG. 8 is a functional block diagram of an alternate embodiment of the Loop Facilities and Control System Module 106 shown in FIG. 5. This alternate embodiment allows the field technician to log onto into the Proactive Maintenance Application 20 and manually update the Proactive Maintenance Application 20 with a completed service order. This manually-entered technician data 114 is acquired by the Proactive Maintenance Application Database 74. The Proactive Maintenance Application Database 74 immediately passes the completed service order information 124 to the Loop Facilities and Control System Module 106. The Loop Facilities and Control System Module 106 sends this completed service order information 124 to the Loop Facilities and Control System 122. This embodiment allows the field technician to update the Loop Facilities and Control System 122 without supervisor effort.

The Technician Dispatch Module 108

Figure 9:
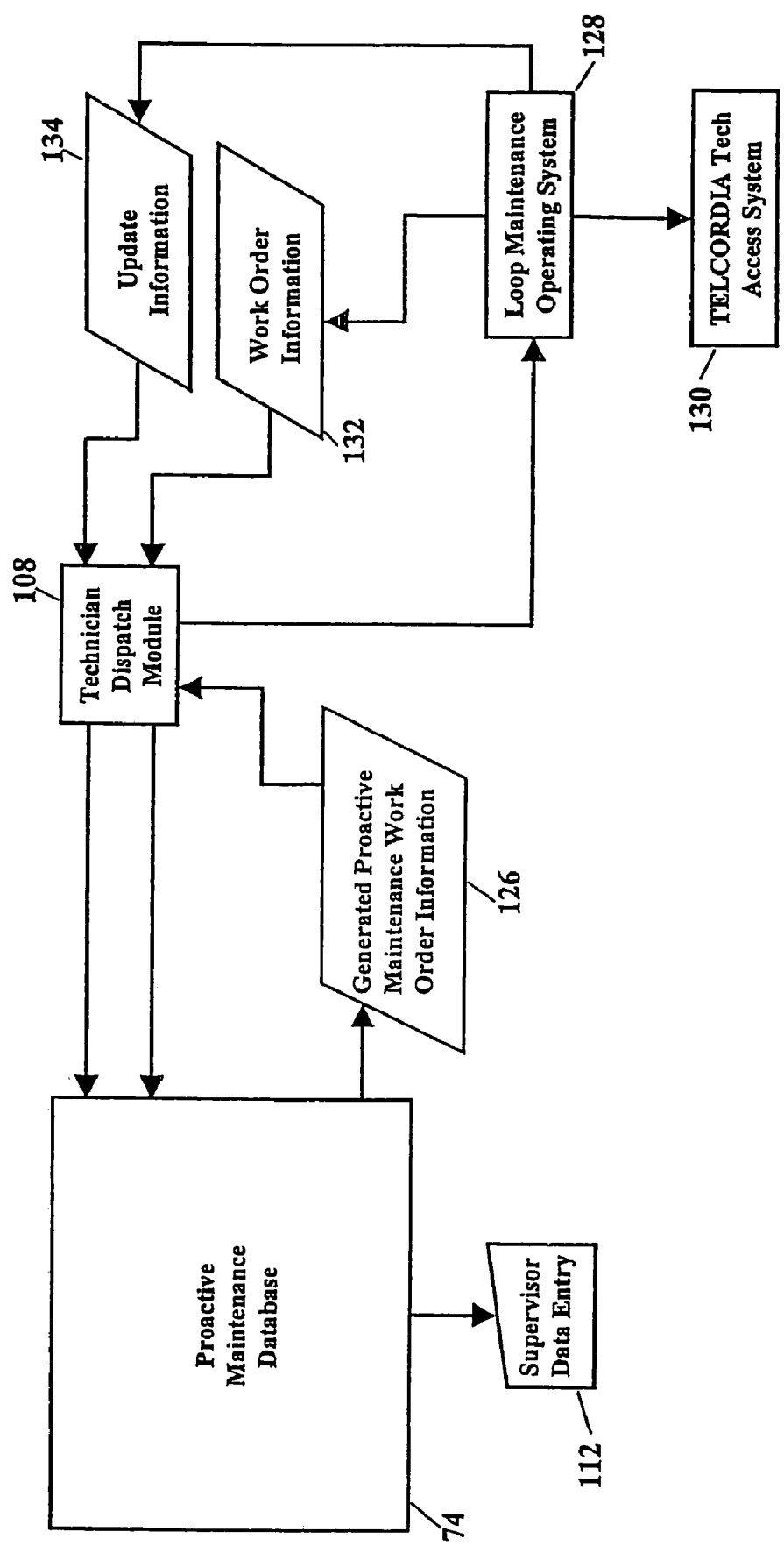
FIG. 9 is a functional block diagram of the Technician Dispatch Module 108 shown in FIG. 5.

FIG. 9 is a functional block diagram of the Technician Dispatch Module 108 shown in FIG. 5. The Technician Dispatch Module 108 not only dispatches proactive maintenance work orders, but the Technician Dispatch Module 108 also tracks field technician proficiencies. Once the Proactive Maintenance Application 20 generates a proactive maintenance work order, the Technician Dispatch Module 108 acquires generated proactive maintenance work order information 126 representing the generated proactive maintenance work order. The Technician Dispatch Module 108 communicates the generated proactive maintenance work order information 126 to a Loop Maintenance Operating System 128. The Loop Maintenance Operating System 128 communicates the generated proactive maintenance work order information 126 to a Tech Access System 130. The Tech Access System 130 is one component of the TELCORDIA™ Work and Force Management Suite of products (TELCORDIA™ is a trademark claimed by Telcordia Technologies, Inc., 445 South St., Morristown, N.J. 07960 USA). The Tech Access System 130 dispatches a work order describing the generated proactive maintenance work order information 126. The Technician Dispatch Module 108, in turn, retrieves and communicates work order information 132 from the Loop Maintenance Operating System 128 to the Proactive Maintenance Application Database 74, with the work order information 132 representing a work order ticket number. The Technician Dispatch Module 108 may also retrieve and communicate hourly update information 134 from the Loop Maintenance Operating System 128 to the Proactive Maintenance Application Database 74. The hourly update information 134 represents the status of each work order ticket number.

Figure 10:
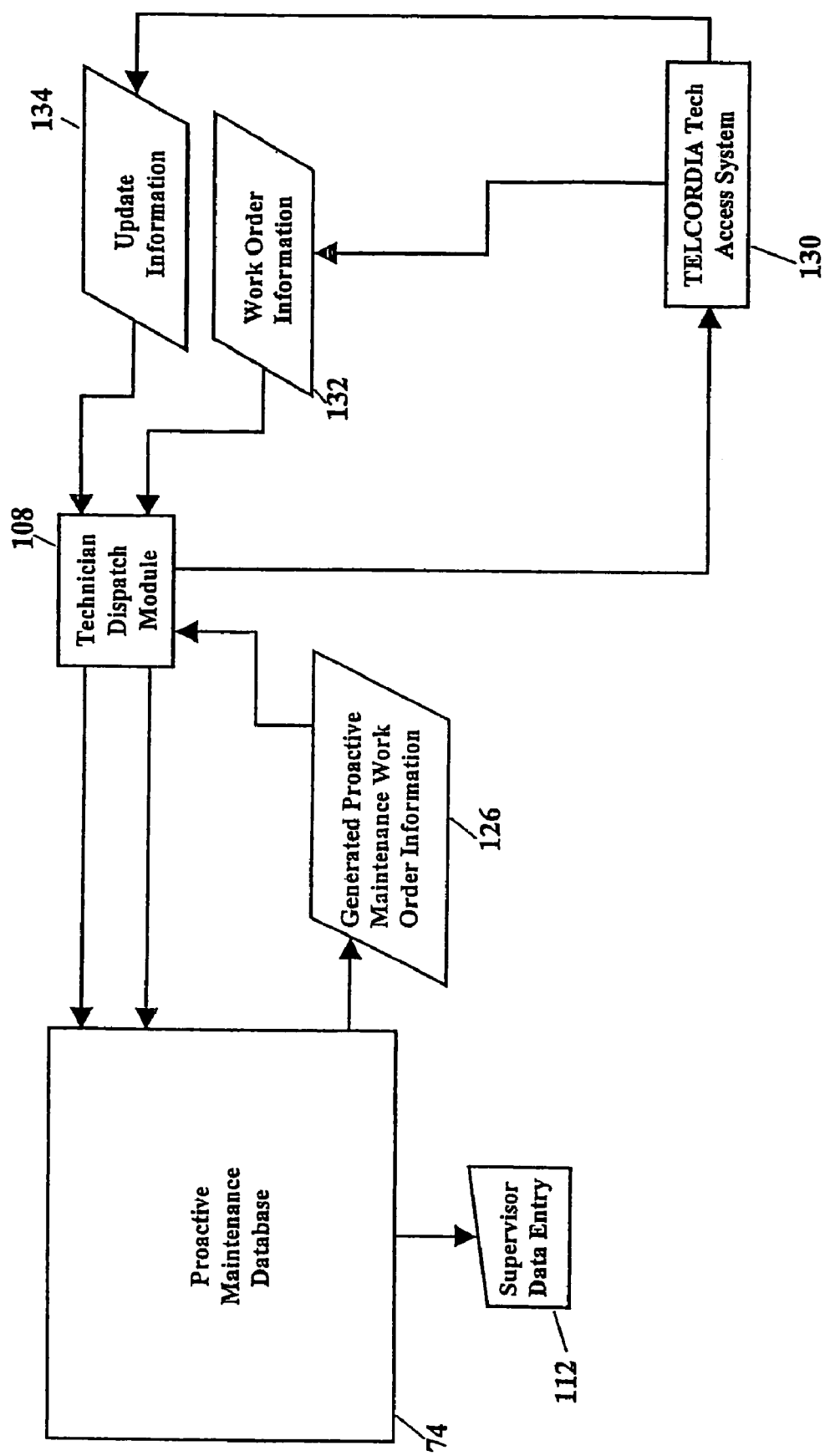
FIG. 10 is a functional block diagram of an alternate embodiment of the Technician Dispatch Module 108 shown in FIG. 5.

FIG. 10 is a functional block diagram of an alternative embodiment of the Technician Dispatch Module 108 shown in FIG. 5. This alternative embodiment allows the Technician Dispatch Module 108 to directly interface with the Tech Access System 130. The Technician Dispatch Module 108 communicates the generated proactive maintenance work order information 126 to the Tech Access System 130. The Tech Access System 130 dispatches a work order describing the generated proactive maintenance work order information 126. The Technician Dispatch Module 108, in turn, retrieves and communicates the work order information 132 to the Proactive Maintenance Application Database 74. The Tech Access System 130 also communicates the hourly update information 134 on the status of each work order ticket number.

The Utilities Module 110

The Utilities module (shown as reference numeral 110 in FIG. 5) manages the proactive maintenance tasks stored in the Proactive Maintenance Application Database 74. The Utilities module contains routines that allow a user to search, edit, add, and even delete records stored in the Proactive Maintenance Application Database 74. The Utilities module, for example, may be used to create new work order tickets, to manually close work order tickets, to dispatch work order tickets, and to find and update work order tickets. Because the Utilities module may be used to create, close, and even alter work orders, the list of approved users may be limited or restricted to field supervisors or to specific user groups.

The Utilities module may be used to issue proactive maintenance tasks. The Utilities module could be used to perform central office work or frame activity. The Utilities module may be used to issue a cable locate request. A user could use the Utilities module to issue installation work orders, such as placing network access wires, placing network interfaces, placing cross-connect jumpers, or placing Digital Loop Carrier cards. The Utilities module could be used to assign pre-installation work at special events (e.g., golf tournaments, football games, the Kentucky Derby). The Utilities module could also be used to assign post-special event breakdown work (removing/dismantling equipment installed for special events). The Utilities module is also used to assign miscellaneous work, such as cleaning graffiti from terminals or repairing cut lines at construction sites.

Figure 11:
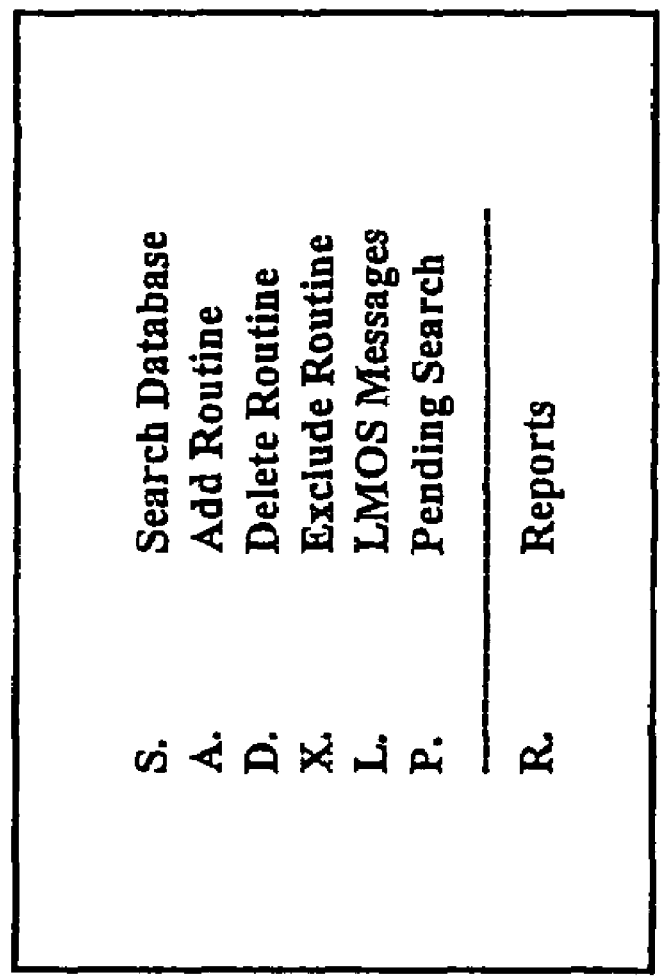
FIG. 11 is a table of available management routines in the Utilities module (shown as reference numeral 110 in FIG. 5)

FIG. 11 is a table of available management routines in the Utilities module. As FIG. 11 shows, a user may search the Proactive Maintenance Application Database (shown as reference numeral 74 in FIG. 5) for a specific proactive maintenance work order or a group of work orders. Users may add new proactive maintenance work orders or delete existing work orders. A user could even exclude a pending proactive maintenance work order that has already been dispatched. Users may view messages from the Loop Maintenance Operating System (shown as reference numeral 128 in FIG. 9) and conduct a search of pending proactive maintenance work orders. The Utilities module also provides various reports formats for generating summary reports. The user strikes keyboard arrow keys to highlight the desired option. The inventor anticipates that the "Search Database" option will be the most frequently used routine, so FIGS. 12-20 will first describe the search option.

FIG. 12 is a graphical representation of "Search Criteria" fields. The "Search Criteria" fields are obtained by highlighting the "Search Database" option shown in FIG. 11. All fields need not be populated. The more fields populated, however, the more selective and more narrow the search. A short description of the various fields is below.

PMA Number—a unique number for each proactive maintenance work order. Because the PMA Number is unique to each proactive maintenance work order, no other search information is required when the complete PMA Number is entered. The PMA Number, in the preferred embodiment, is a nine (9) digit number. The format is yymmnnnnn, where yy is year, mm is month, and nnnnn is a sequential number assigned by the Proactive Maintenance Application.

LMOS TTN—a Trouble Ticket Number generated by the Loop Maintenance Operating System (shown as reference numeral 128 in FIG. 9).

Status—each proactive maintenance task has a status. "Pending" would indicate the Proactive Maintenance Application has created a work order, but the work order has not been sent to the Technician Dispatch Module (shown as reference numeral 108 in FIGS. 5, 9, and 10). "Dispatched" would indicate the work order has been sent to the Technician Dispatch Module and a Trouble Ticket Number has been assigned. "Completed" indicates the work order has been completed. "Excluded" indicates the work order has been excluded from "pending" status.

Specify Sort Order—allows the user to sort the retrieved data (this option will be discussed below with reference to FIG. 13).

NPA WC—the area code and Wire Center assigned to proactive maintenance work orders.

District—a four (4) digit district number assigned to proactive maintenance work orders.

Manager—the manager responsible for the proactive maintenance task.

Supervisor—the supervisor responsible for the proactive maintenance task.

Tech—the assigned-technicians name, employee number, or other identification.

Work By—the desired date(s) for performing the work order.

Pending—the date(s) the work order is (or was) pending.

Dispatch—the date(s) the proactive maintenance work order was downloaded to the Technician Dispatch Module.

Complete—the date(s) the work order was completed.

Work Address—search all work orders containing matching character string for work address.

Work Description—search all work orders containing matching character string for work description.

FST Narrative—search all work orders containing matching character string for Field Service Technician's narrative.

Disp Code—standard codes for reporting proactive work activity.

Priority—ranges from zero (0) to ten (10).

IST—Intermediate Status (1ST) code assigned by Technician Dispatch module. Examples include Bulk Dispatched Out ("BDO"), Delayed Dispatch Out ("DDO"), Pre-assigned Out ("PAO"), Dispatched Out ("DPO"), Closed in LMOS and PMA ("CLO"), and Pending Dispatch ("PD8").

Work Code—work codes specified by a particular state or administrator.

Auth #—a number assigned by supervisory groups, such as Proactive Analysis and Repair and Facilities Analysis and Planning.

Type—these codes are shorthand descriptions of proactive maintenance jobs. "RTAP," for example, would indicate routine proactive maintenance for air pressure issues. "RTCALOC" indicates a cable locate request. "RTCDPL" indicates clear defective pair lists. Other simple, shorthand codes can be developed to describe common jobs.

Cable—search by cable.

Pair—search by pair.

FIG. 13 is a graphical representation of "Sort Order" fields. The "Sort Order" fields are obtained by entering "Y" (for "Yes") in the "Specify Sort Order" field shown in FIG. 12. This option allows the user to sort retrieved data. The user uses keyboard arrow keys to scroll between fields. The user, for example, may enter a "1" to sort first by "Manager." The user may then scroll and enter a "2" to sort second by "District." The user can specify as many sort fields as desired. The Utilities module will then perform sorting routines as specified by the user.

FIG. 14 is a graphical representation of data from the Proactive Maintenance Application. Once the user populates the desired "Search Criteria" fields (shown in FIG. 12), the Utilities module performs the search routine and sorts the results as specified. The searched and sorted results are presented as shown in FIG. 14. An upper portion of the results contains the same fields (and respective definitions)

as shown in FIG. 12. A lower portion of the results displays unique information for each highlighted proactive maintenance work order. As a cursor is scrolled from one work order to another, unique information to each highlighted work order is presented in the lower portion. A bottom portion of the results contains additional functions that the user can select.

FIGS. 15-18 are graphical representations further describing the additional user-selected functions shown in FIG. 14. FIG. 15 is a graphical representation of the "Notes" function. FIG. 15 shows the user may view "Notes" annotating each highlighted work order. FIG. 16 is a graphical representation of the "Cable" function. FIG. 16 shows the user may request and receive a list of cable and line pair counts associated with a work order. FIG. 17 is a graphical representation of the "Messages" function. FIG. 17 shows the user may request and receive messages associated with each work order. The user can thus determine the name of the person creating the work order, the time the work order was dispatched to a technician, and the time the work order was completed. Users may also request and receive messages from the Technician Dispatch module, such as Loop Maintenance Operating System (LMOS) messages and time stamps. FIG. 18 is a graphical representation of the "Dispatch" function. The user highlights the desired work orders and selects the "Select" option. Once all the desired work orders have been selected, choosing "Dispatch" then dispatches the selected work orders to the Technician Dispatch module.

FIG. 19 is a graphical representation of the "Edit" function shown in FIG. 14. The "Edit" function allows a user to change, update, add, or delete information used and presented by the Proactive Maintenance Application. As FIG. 19 shows, when the "Edit" function is selected, fields that can be user-edited are underscored or highlighted. Some fields, however, have strict data format requirements. The Utilities module, therefore, may perform a validation to ensure any edited fields conform to the format requirements. If any invalid data is entered in a formatted field, the Utilities module will display an error message. The Utilities module will not accept invalid data.

FIG. 20 is a graphical representation of the "Print" function shown in FIG. 14. This function allows the user to print the results to a designated printer, or the user could email the results to an account. FIG. 20 shows the user may enter the recipient's email address or, as the user types, choose from a list of matching addresses. The user may this type the first letters of the recipient's name and scroll to highlight the matching recipient.

Now that the "Search" option is described, the discussion returns to FIG. 11. FIG. 11 shows a user may additionally choose to manually add, delete, and exclude work orders in the Proactive Maintenance Application database (shown as reference numeral 74 in FIG. 5). FIGS. 21, 22, and 23 further describe the add, delete, and exclude options.

FIG. 21 is a graphical representation of the "Add Routine" option shown in FIG. 11. Most of the data fields are the same as that discussed with reference to the "Search Criteria" fields of FIG. 12. Those fields not previously discussed will be described. A "yes" in the "Clear Data?" field clears all fields after transmitting each new manually-added work order. Although the default is a "yes," changing the default to "no" will retain most data fields. The "Maintenance Center" field is automatically populated when the wire center number is entered. A "no" in the "Pre-Assign" field indicates the manually-added work order is not pre-assigned, bulked, or delay dispatched to a specific technician. A "yes" in the "Pre-Assign" field is the opposite and indicates the manually-added work order is pre-assigned, bulked, or delay dispatched to a specific technician. The "Pre-Est" is a required field and the user must enter an estimated time for the added work order. The "Additional Tasks" field defaults to "no" unless the estimated number of hours exceeds eight (8). The "Task" field, likewise, defaults to (1) unless the estimated number of hours exceeds eight (8). Once the "Add Routine" data fields have been entered, the Proactive Maintenance Application assigns a PMA Number. The assigned PMA Number is shown near the bottom left corner of FIG. 21.

FIG. 22 is a graphical representation of the "Delete Routine" option shown in FIG. 11. The "Delete Routine" option allows the user to delete proactive maintenance work orders that have not been sent to the Technician Dispatch module (shown as reference numeral 108 in FIGS. 5, 9, and 10). If the proactive maintenance work order is no longer needed, or aged, or duplicated in another work order, the user would delete the work order. As FIG. 22 shows, the user enters the PMA Number to be deleted. The Utilities module then retrieves work order information matching the PMA Number. The user is then prompted to verify deletion of the records. If a user tries to delete a work order created or added by someone else, the Utilities module could send a message denying such a privilege. Only a Systems Administrator, as a precaution, would generally have authorization to delete work orders created by another user.

FIG. 23 is a graphical representation of the "Exclude Routine" option shown in FIG. 11. The "exclude Routine" allows a user to exclude work orders that cannot be deleted. Work orders that have been sent to the Technician Dispatch module (shown as reference numeral 108 in FIGS. 5, 9, and 10) cannot be deleted, so these dispatched work orders must be excluded. A user, for example, may assign three (3) work orders A, B, and C to a field technician. The user may estimate work order A requires eight (8) hours, work order B requires four (4) hours, and work order C requires four (4) hours. If, however, the technician completes all three work orders in eight (8) hours, work orders B and C are now unnecessary, but, still queued for completion. Because work orders B and C have been dispatched to the Technician Dispatch module, work orders B and C cannot be removed using the "Delete Routine" option (shown and described in FIG. 22). The "exclude Routine" is then used to remove work orders B and C. As FIG. 23 shows, the user enters the PMA Number to be excluded. The Utilities module then retrieves work order information matching the PMA Number. The user is then prompted to verify exclusion of the records.

Now that the "Add Routine," "Delete Routine," and "Exclude Routine" have been described, the discussion again returns to FIG. 11. FIG. 11 shows a user may additionally choose to retrieve "LMOS Messages" from the Loop Maintenance Operating System and to conduct a "Pending Search" of pending proactive maintenance work orders. FIGS. 24 and 25 further describe the "LMOS Messages" option and the "Pending Search" option.

FIG. 24 is a graphical representation of the "LMOS Messages" option shown in FIG. 11. This option allows the user to retrieve messages from the Loop Maintenance Operating System (shown as reference numeral 128 in FIG. 9). The Proactive Maintenance Application creates a message indicating the Trouble Ticket Number assigned by the Loop Maintenance Operating System (the Trouble Ticket Number was previously described with reference to FIG. 12). The "LMOS Messages" option allows the user to retrieve the assigned PMA Number, the time and date the work order was sent to the Technician Dispatch System, and the name of the user dispatching the work order. The user, additionally, may retrieve the Trouble Ticket Number, any associated line records, and the date and time the work order was completed. As FIG. 24 shows, the user may print or email the "LMOS Messages" and "find" messages associated with a particular PMA Number.

FIG. 25 is a graphical representation of the "Pending Search" option shown in FIG. 11. This option allows the user to search pending work orders. The user populates as many "Search Criteria" fields as possible with known information. Most fields, as before, have been previously described. The "Hour—From & To" field, however, represents a range of the estimates hours for completing a work order. A range, for example, of from three (3) to six (6) hours would return a listing of all pending work orders with an estimated time to complete of from three (3) to six (6) hours. Once the user populates the known fields, the Proactive Maintenance Application retrieves pending work orders matching the search criteria. The retrieved pending work orders may be presented as shown in FIG. 14. Those of ordinary skill recognize the results retrieved from "Pending Search" option may be sorted as shown and discussed with reference to FIG. 13.

Figure 26:
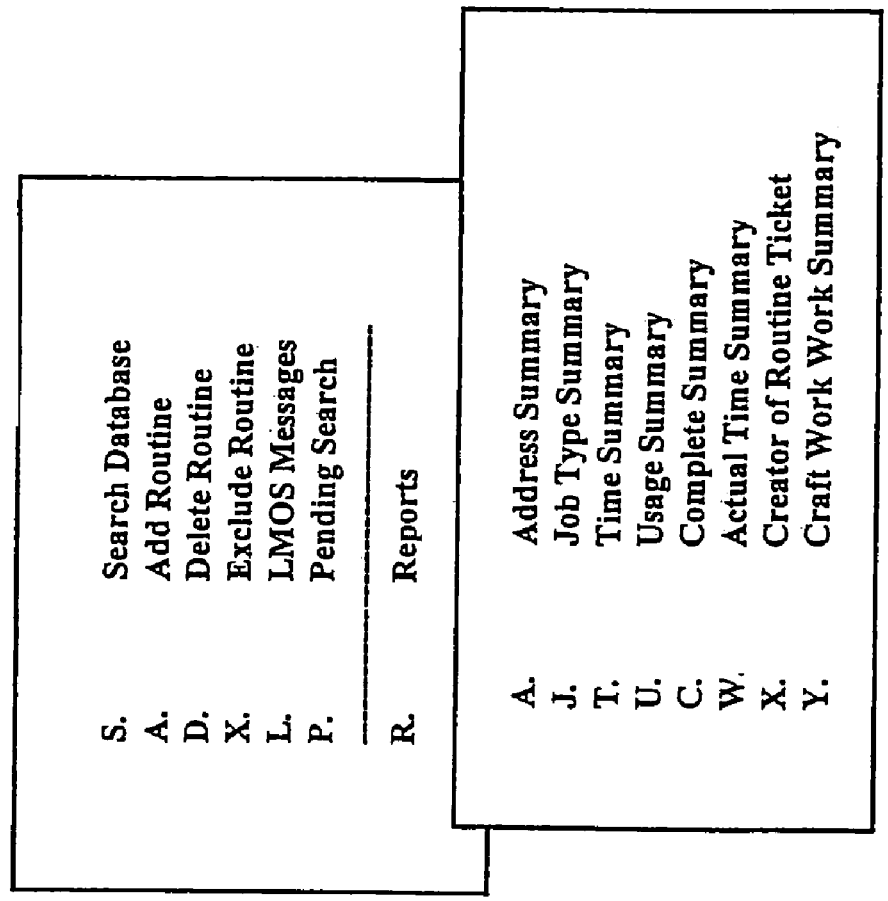
FIG. 26 is a graphical representation of a sub-menu for the "Reports" option shown in FIG. 11.

The discussion returns to the "Reports" option shown in FIG. 11. The "Reports" option allows the user to request a summary of proactive maintenance work orders using various reporting formats. FIG. 26 provides a further explanation of the "Reports" option.

FIG. 26 is a graphical representation of a sub-menu for the "Reports" option. The sub-menu allows the user to request various reporting summaries for proactive maintenance work orders. "Address," as described earlier, provides a summary report sorted by work address. "Job Type" is a summary listing sorted by the type of maintenance job. "Time" is a summary report sorted by estimated time, average time, completed time, and any other time measurement of efficiency or performance. "Usage" provides a summary sorted by date or by a range of dates. "Completed Routines" is a summary of proactive maintenance work orders completed on a date or during a specified range of dates. "Actual Time Summary" is a report of each technician's completed proactive maintenance tasks during a range of dates, including the estimated time for the job and the actual time for completion. The "Creator of Routine Tickets" selection is a summary report listing the person creating the work order, the person's title, the person's employee number, and the PMA Number. "Craft Work Summary" lists the technician number, manager, supervisor, Trouble Ticket Number, line records, dispatch date and time, and completion date and time.

EXAMPLE

Figure 27:
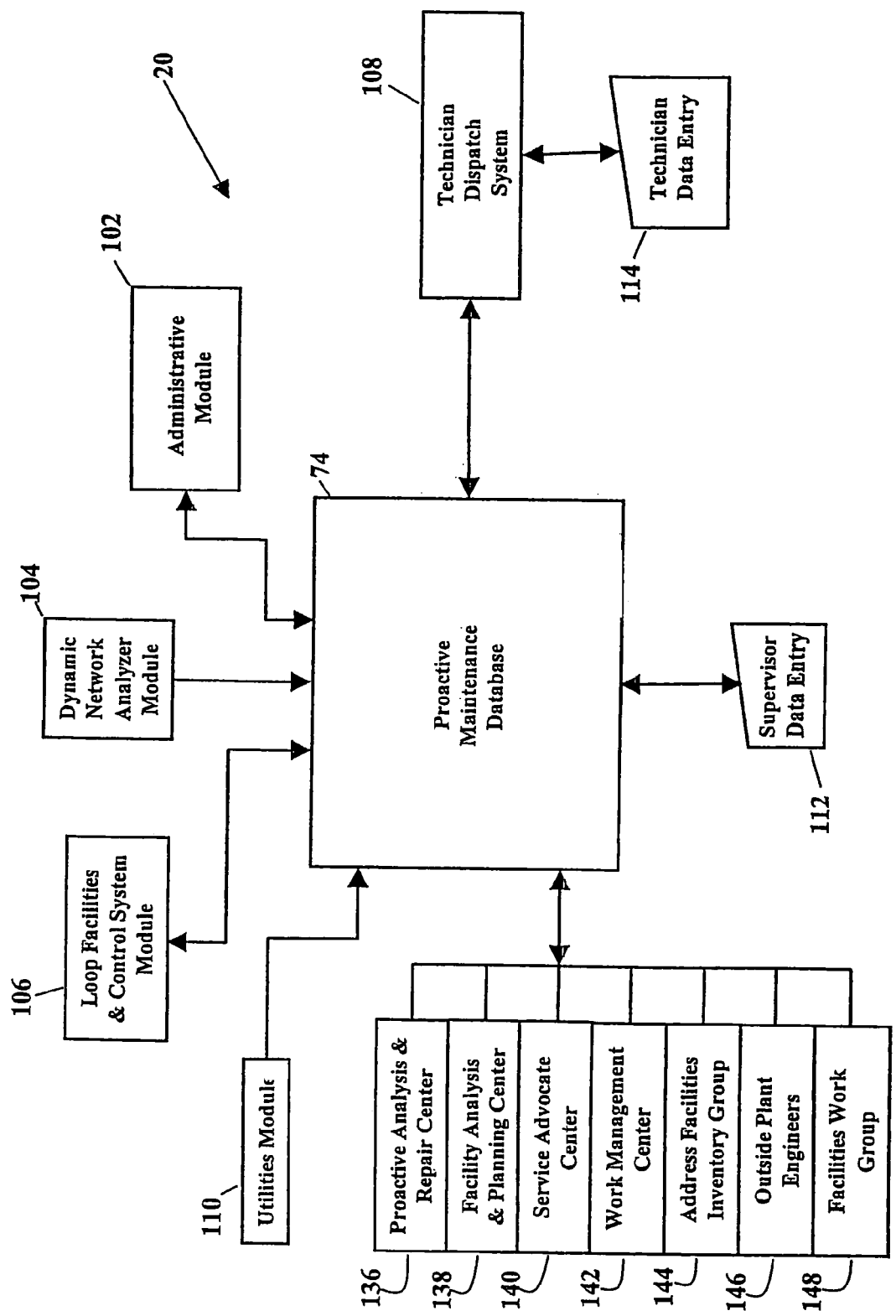
FIG. 27 is a block diagram showing a non-limiting example for proactively maintaining the local loop.

The Proactive Maintenance Application 20 is further illustrated by the following non-limiting example. FIG. 27 is a block diagram showing this particular non-limiting example is further configured for proactively maintaining the local loop (shown as reference numeral 78 in FIG. 4A). This non-limiting example is similar to that shown in FIG. 5, however, this example allows the Proactive Maintenance Application Database 74 to be accessed by several user groups. These user groups include a Proactive Analysis and Repair Center 136, a Facilities Analysis and Planning Center 138, a Service Advocate Center 140, a Work Management Center 142, an Address Facilities Inventory Group 144, Outside Plant Engineers 146, and a Facilities Work Group 148. These user groups have authority to access some or all information stored in the S Proactive Maintenance Application Database 74. Some user groups may even have authority to alter information stored in the Proactive Maintenance Application Database 74. The Proactive Analysis and Repair Center 136, for example, has authority to alter the Dynamic Network Analyzer information 116 (shown as reference numeral 116 in FIG. 6). The Facilities Analysis and Planning Center 138, likewise, has authority to assign in bulk any repairs to copper line pairs. The Systems Administrator may authorize as many groups as desired to access and even alter information stored in the Proactive Maintenance Application 20. The Proactive Maintenance Application 20 thus allows dedicated groups to monitor corporate-wide proactive maintenance. This corporate-wide monitoring ensures the local loop is proactively and uniformly maintained in all states and regions.

Once information is acquired and stored in the Proactive Maintenance Application Database 74, the Proactive Maintenance Application 20 prioritizes proactive maintenance procedures. The Proactive Maintenance Application 20 uses weighted formulas to prioritize proactive maintenance work orders. The weighted formulas predict proactive maintenance for Predictor indications, copper line pair changes, predict proactive maintenance for Dynamic Network Analyzer work orders, and predict proactive maintenance bulk copper line pair recovery. The following paragraphs describe each formula and its associated terms.

A weighted formula for predicting proactive maintenance using Predictor trends is first described. As those of ordinary skill recognize, Predictor is a computer program that collects nightly switch information. A Predictor module communicates with the communications network and acquires this nightly switch information. The Proactive Maintenance Application uses this nightly switch information to predict proactive maintenance based upon the Predictor trends. The nightly switch information may also be used by the Dynamic Network Analyzer module to predict proactive maintenance and to indicate TSI's since a work order was created and dispatched. The formula $$\frac{W_1(FEF0) + W_2(FEF1) + W_3(\text{number of defective line pairs}) + W_4(FEF0SI) + W_5(FEF1SI)}{\text{Time per task for Predictor packages}}$$

has both weighting variables and terms. The weighting variables are $W_1$, $W_2$, $W_3$, $W_4$, and $W_5$, while the terms are FEF0, FEF1, FEF0SI, and FEF1SI. The terms "number of defective line pairs" and "Time per task for Predictor packages" are self-evident to those of ordinary skill and will not be further described. The weighting variables will be later shown and described in a table.

As those of ordinary skill recognize, the terms are common telephony disposition codes. FEF0, for example, indicates a foreign electromotive force was found on the customer's line. A foreign electromotive force may be discovered during a mechanized loop test. FEF1 indicates a battery is present on the F1 facility or the facilities leaving the central office. FEF0SI indicates a foreign electromotive force since a work order was issued. FEF1SI, likewise, indicates a battery is present since a work order was issued.

A weighted formula for predicting copper line pair changes is next described. The formula is $$\frac{A + B}{\text{Time per task for a pair change}}$$

where $A = W_6(\text{Code 4}) + W_7(\text{Code 7}) + W_8(\text{Code 9}) + W_9(\text{Predictor})$ and $B = W_{10}$ (number of defective line pairs) $+ W_{11}(\text{TSI4}) + W_{12}(\text{TSI7}) + W_{13}(\text{TSI9})$.

The formula, as above, has both weighting variables and terms. The weighting variables are $W_6$, $W_7$, $W_8$, $W_{11}$, $W_{12}$, and $W_{13}$, while the terms are Code 4, Code 7, Code 9, TSI4, TSI7, and TSI9. The terms "number of defective line pairs" and "time per task for a pair change" are self-evident to those of ordinary skill and will not be further described. The weighting variables will be later shown and described in a table.

The terms, again, are common telephony disposition codes. Code 4 applies to all troubles found in cables, cable terminals, amplifiers, line wire, load coils and protection, field-located concentrators, field-located carrier equipment, and field-located loop electronics. Code 4 also includes trouble reports resulting from a failure of the outside local loop equipment. Code 7 applies to those trouble reports that are tested and verified without dispatching a field technician. Code 7 indicates a trouble report was tested/retested and verified as corrected, either manually or mechanically, so no dispatch is required. Code 7 would include customers who verify their equipment is properly working before a mechanical or manual test is conducted. Code 9 applies when a dispatched field technician cannot locate a root cause of the trouble. Code 9 includes trouble reports referred first to central office forces, but subsequently, dispatched to outside forces.

As those of ordinary skill also understand, the TSI terms indicate Trouble Since Issued (hence "TSI") dispositions. The Trouble Since Issued dispositions (as previously explained with reference to FIG. 6) applies to trouble received after the proactive maintenance work orders have been developed, but, not dispatched. TSI4, for example, indicates Code 4 trouble was received after the proactive maintenance work order was predicted. TSI7 and TSI9, similarly, indicate Code 7 trouble or Code 9 trouble, respectively, was received.

A weighted formula for predicting Dynamic Network Analyzer proactive maintenance is next described. The formula is $$\frac{C + D}{\text{Time per task for Dynamic Network Analyzer work order}}$$

where $C = W_{14}(\text{Code 4}) + W_{15}(\text{Code 7}) + W_{16}(\text{Code 9}) + W_{17}(\text{Predictor})$ and $D = W_{18}$ (number of defective line pairs) $+ W_{19}(\text{TSI4}) + W_{20}(\text{TSI7}) + W_{21}(\text{TSI9})$.

The terms Code 4, Code 7, Code 9, TSI4, TSI7, and TSI9 are the same as described above. The terms "number of defective line pairs" and "time per task for Dynamic Network Analyzer work order" are self-evident to those of ordinary skill and will not be further described. The weighting variables will be later shown and described in a table.

A weighted formula for predicting bulk copper line pair recovery is next described.

The formula is $$\frac{W_{22}(\text{growth})(\text{number of defective line pairs})}{(\text{number of spare line pairs})(\text{time per task for bulk pair recovery})}$$

The term "growth" is the increase in loop activity created by requests for new service and for new customers. The terms "number of defective line pairs, number of spare line pairs," and "time per task for bulk pair recovery" are again self-evident to those of ordinary skill and will not be further described. The weighting variables are shown and described below.

The weighting variables are chosen based upon field experience. As those of ordinary skill recognize, the weighting variables are used to adjust predicted results. The predicted results are compared with actual field results. The weighting variables are then adjusted until the predicted results closely approximate actual field results. As those of ordinary skill also recognize, the weighting variables may be continually refined to improve predicted work order results. The table below shows the values of the weighting variables used in the non-limiting example. These weighting variables were selected based upon the actual results of 170 predicted work orders.

| Weighting Variable | Value |
| --- | --- |
| $W_1$ | 0.89 |
| $W_2$ | 0.50 |
| $W_3$ | 5.90 |
| $W_4$ | 0.89 |
| $W_5$ | 0.50 |
| $W_6$ | 0.24 |
| $W_7$ | 0.24 |
| $W_8$ | 0.24 |
| $W_9$ | 9.20 |
| $W_{10}$ | 1.60 |
| $W_{11}$ | 0.54 |
| $W_{12}$ | 0.24 |
| $W_{13}$ | 0.24 |
| $W_{14}$ | 0.18 |
| $W_{15}$ | 0.18 |
| $W_{16}$ | 0.45 |
| $W_{17}$ | 13.4 |
| $W_{18}$ | 0.18 |
| $W_{19}$ | 0.90 |
| $W_{20}$ | 0.18 |
| $W_{21}$ | 0.45 |
| $W_{22}$ | 0.08 |

While the present invention has been described with respect to various features, aspects, and embodiments, those skilled and unskilled in the art will recognize the invention is not so limited. Other variations, modifications, and alternative embodiments may be made without departing from the spirit and scope of the present invention.

What is claimed is:

1. A method of managing proactive maintenance tasks for a communication system, the method comprising:

storing proactive maintenance tasks;

searching the tasks using at least one search criteria;

permitting deletion of proactive maintenance tasks if the proactive maintenance task has not been sent to a technician dispatch;

permitting exclusion of proactive maintenance tasks if the proactive maintenance task has been sent to the technician dispatch module.

2. A method of managing proactive maintenance tasks according to claim 1, further comprising predicting proactive maintenance tasks.

3. A method of managing proactive maintenance tasks according to claim 1, wherein the at least one search criteria includes at least one of Proactive Maintenance Application number, Trouble Ticket Number, area code, status, Wire Center, district, manager, and supervisor.

4. A method of managing proactive maintenance tasks according to claim 1, wherein the at least one search criteria includes at least one of technician date, address, description, technician narrative, disposition code, priority, intermediate status code, work code, authorization, cable, and line pair.

5. A method of managing proactive maintenance tasks according to claim 1, further comprising sorting the tasks using at least one sort criteria.

6. A method of managing proactive maintenance tasks according to claim 5, wherein the sort criteria includes at least one of Proactive Maintenance Application number, Trouble Ticket Number, area code, status, Wire Center, district, manager, and supervisor.

7. A method of managing proactive maintenance tasks according to claim 5, wherein the sort criteria includes at least one of technician, date, address, priority, status code, work code, and authorization.

8. A method of managing proactive maintenance tasks according to claim 1, further comprising editing the proactive maintenance tasks using at least one edit criteria, the edit criteria including at least one of wire center, district, priority, date, work code, manager, supervisor, technician, maintenance center, authorization, address, and work description.

9. A method of managing proactive maintenance tasks according to claim 1, further comprising acquiring cable and line pair information associated with the proactive maintenance tasks.

10. A method of managing proactive maintenance tasks according to claim 1, further comprising generating work order information describing the proactive maintenance tasks.

11. A method of managing proactive maintenance tasks according to claim 1, further comprising dispatching the proactive maintenance tasks.

12. A method of managing proactive maintenance tasks according to claim 1, further comprising adding additional proactive maintenance tasks to the stored tasks.

13. A method of managing proactive maintenance tasks according to claim 1, further comprising communicating with a communications network and acquiring information associated with a Loop Maintenance Operating System.

14. A method of managing proactive maintenance tasks according to claim 1, further comprising searching pending proactive maintenance tasks.

15. A method of managing proactive maintenance tasks according to claim 1, further comprising generating summary reports describing the tasks.

16. A system configured for predicting proactive maintenance of a communication system, the system comprising:

a database stored in memory, the database storing information associated with the communications network;

a processor capable of processing information stored in the database and of generating predicted proactive maintenance; and a utilities module for managing the predicted proactive maintenance, the managing including;

storing proactive maintenance tasks;

searching the tasks using at least one search criteria;

permitting deletion of proactive maintenance tasks if the proactive maintenance task has not been sent to a technician dispatch module;

permitting exclusion of proactive maintenance tasks if the proactive maintenance task has been sent to the technician dispatch module.

17. A computer program product for proactively maintaining a communications system; comprising:

a computer-readable medium; and a utilities module stored on the medium, the utilities module managing proactive maintenance tasks, the managing including;

storing proactive maintenance tasks;

searching the tasks using at least one search criteria;

permitting deletion of proactive maintenance tasks if the proactive maintenance task has not been sent to a technician dispatch module;

permitting exclusion of proactive maintenance tasks if the proactive maintenance task has been sent to the technician dispatch module.

* * * * *